(12) United States Patent
Bodnar et al.

(10) Patent No.: US 7,372,485 B1
(45) Date of Patent: May 13, 2008

(54) DIGITAL CAMERA DEVICE AND METHODOLOGY FOR DISTRIBUTED PROCESSING AND WIRELESS TRANSMISSION OF DIGITAL IMAGES

(75) Inventors: Eric O. Bodnar, Santa Cruz, CA (US); Shekhar Kirani, Capitola, CA (US); Venkat V. Easwar, Cupertino, CA (US); Philippe R. Kahn, Scotts Valley, CA (US); Sonia Lee Kahn, Scotts Valley, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 0 days.

(21) Appl. No.: 09/434,703

(22) Filed: Nov. 5, 1999

Related U.S. Application Data

(60) Provisional application No. 60/138,168, filed on Jun. 8, 1999.

(51) Int. Cl.
H04N 9/68 (2006.01)
H04N 7/12 (2006.01)
(52) U.S. Cl. .............. 348/234; 375/240.18; 375/240.19
(58) Field of Classification Search ................ 348/234, 348/394.1, 396.1, 552, 273; 375/240.18, 375/240.19, 240.2; 382/248, 232
See application file for complete search history.

(56) References Cited

U.S. PATENT DOCUMENTS 4,992,887 A * 2/1991 Aragaki ....................... 358/403
5,067,029 A 11/1991 Takahashi (Continued)

FOREIGN PATENT DOCUMENTS

EP 0763943 A 3/1997

(Continued)

OTHER PUBLICATIONS

Corcoran, P., "Internet Enabled Digital Photography", 1999 Digest of Technical Papers, IEEE, Jun. 22-24, 1999.

(Continued)

*Primary Examiner*—David Ometz
*Assistant Examiner*—Luong T. Nguyen
(74) *Attorney, Agent, or Firm*—Blakely, Sokoloff, Taylor & Zafman, LLP; Judith A. Szepesi

(57) ABSTRACT

A digital imaging system is described that provides techniques for reducing the amount of processing power required by a given digital camera device and for reducing the bandwidth required for transmitting image information to a target platform. The system defers and/or distributes the processing between the digital imager (i.e., digital camera itself) and the target platform that the digital imager will ultimately be connected to. In this manner, the system is able to decrease the actual computation that occurs at the digital imager. Instead, the system only performs a partial computation at the digital imager device and completes the computation somewhere else, such as at a target computing device (e.g., desktop computer) where time and size are not an issue (relative to the imager). By deferring resource-intensive computations, the present invention substantially reduces the processor requirements and concomitant battery requirements for digital cameras. Further, by adopting an image strategy optimized for compression (compressed luminosity record), the present invention decreases the bandwidth requirements for transmitting images, thereby facilitating the wireless transmission of digital camera images.

50 Claims, 11 Drawing Sheets

U.S. PATENT DOCUMENTS

| | | | |
|---|---|---|---|
| 5,172,227 | A | 12/1992 | Tsai et al. |
| 5,249,053 | A | 9/1993 | Jain |
| 5,412,427 | A * | 5/1995 | Rabbani et al. .......... 348/394.1 |
| 5,526,047 | A | 6/1996 | Sawanobori |
| 5,548,789 | A | 8/1996 | Nakanura |
| 5,552,824 | A | 9/1996 | DeAngelis et al. |
| 5,652,621 | A | 7/1997 | Adams, Jr. et al. |
| 5,657,077 | A | 8/1997 | DeAngelis et al. |
| 5,682,152 | A * | 10/1997 | Wang et al. ........... 375/240.18 |
| 5,734,831 | A | 3/1998 | Sanders |
| 5,737,491 | A | 4/1998 | Allen et al. |
| 5,754,227 | A * | 5/1998 | Fukuoka ..................... 348/552 |
| 5,761,655 | A | 6/1998 | Hoffman |
| 5,781,901 | A | 7/1998 | Kuzuma |
| 5,790,878 | A | 8/1998 | Anderson et al. |
| 5,798,794 | A * | 8/1998 | Takahashi .............. 375/240.19 |
| 5,818,525 | A | 10/1998 | Elabd |
| 5,826,023 | A | 10/1998 | Hall et al. |
| 5,835,580 | A | 11/1998 | Fraser |
| 5,848,193 | A | 12/1998 | Garcia |
| 5,870,383 | A | 2/1999 | Eslambolchi et al. |
| 5,880,856 | A | 3/1999 | Ferriere |
| 5,896,502 | A | 4/1999 | Shieh et al. |
| 5,903,723 | A | 5/1999 | Beck et al. |
| 5,913,088 | A | 6/1999 | Moghadam et al. |
| 5,917,542 | A | 6/1999 | Moghadam et al. |
| 6,008,847 | A * | 12/1999 | Bauchspies ................ 382/232 |
| 6,009,201 | A | 12/1999 | Acharya |
| 6,020,920 | A | 2/2000 | Anderson |
| 6,028,807 | A | 2/2000 | Awsienko |
| 6,031,964 | A | 2/2000 | Anderson |
| 6,043,837 | A | 3/2000 | Driscoll, Jr. et al. |
| 6,064,437 | A | 5/2000 | Phan et al. |
| 6,067,383 | A | 5/2000 | Taniguchi et al. |
| 6,091,777 | A | 7/2000 | Guetz et al. |
| 6,101,320 | A | 8/2000 | Schuetze et al. |
| 6,104,430 | A | 8/2000 | Fukuoka |
| 6,125,201 | A | 9/2000 | Zador |
| 6,128,413 | A * | 10/2000 | Benamara .................. 382/251 |
| 6,154,493 | A * | 11/2000 | Acharya et al. ....... 375/240.19 |
| 6,157,746 | A | 12/2000 | Sodagar et al. |
| 6,163,604 | A | 12/2000 | Baulier et al. |
| 6,195,026 | B1 | 2/2001 | Acharya |
| 6,198,941 | B1 | 3/2001 | Aho et al. |
| 6,202,060 | B1 * | 3/2001 | Tran .............................. 707/3 |
| 6,239,837 | B1 | 5/2001 | Yamada et al. |
| 6,243,420 | B1 * | 6/2001 | Mitchell et al. ....... 375/240.18 |
| 6,256,666 | B1 | 7/2001 | Singhal |
| 6,285,775 | B1 | 9/2001 | Wu et al. |
| 6,297,870 | B1 | 10/2001 | Nanba |
| 6,311,215 | B1 | 10/2001 | Bakshi et al. |
| 6,330,068 | B1 | 12/2001 | Matsuyama |
| 6,348,929 | B1 * | 2/2002 | Acharya et al. ............ 348/273 |
| 6,360,252 | B1 | 3/2002 | Rudy et al. |
| 6,385,177 | B1 | 5/2002 | Suda et al. |
| 6,392,699 | B1 * | 5/2002 | Acharya ..................... 348/273 |
| 6,417,882 | B1 | 7/2002 | Mahant-Shetti |
| 6,424,739 | B1 | 7/2002 | Ukita et al. |
| 6,445,412 | B1 | 9/2002 | Shiohara |
| 6,449,658 | B1 | 9/2002 | Lafe et al. |
| 6,457,044 | B1 | 9/2002 | IwaZaki |
| 6,459,816 | B2 | 10/2002 | Matsuura et al. |
| 6,463,177 | B1 | 10/2002 | Li et al. |
| 6,480,853 | B1 | 11/2002 | Jain |
| 6,505,236 | B1 | 1/2003 | Pollack |
| 6,509,910 | B1 | 1/2003 | Agarwal et al. |
| 6,539,169 | B1 | 3/2003 | Tsubaki et al. |
| 6,542,186 | B2 | 4/2003 | Uryu |
| 6,542,748 | B2 | 4/2003 | Hendry et al. |
| 6,546,143 | B1 | 4/2003 | Taubman |
| 6,549,958 | B1 | 4/2003 | Kuba |
| 6,577,338 | B1 | 6/2003 | Tanaka et al. |
| 6,583,813 | B1 | 6/2003 | Enright et al. |
| 6,598,076 | B1 | 7/2003 | Chang et al. |
| 6,600,930 | B1 | 7/2003 | Sakurai et al. |
| 6,606,669 | B1 | 8/2003 | Nakagiri |
| 6,615,224 | B1 | 9/2003 | Davis |
| 6,628,325 | B1 | 9/2003 | Steinberg |
| 6,630,954 | B1 | 10/2003 | Okada |
| 6,704,712 | B1 | 3/2004 | Bleiweiss |
| 6,725,300 | B1 | 4/2004 | Nagasaka et al. |
| 6,734,994 | B2 | 5/2004 | Omori |
| 6,742,043 | B1 | 5/2004 | Moussa et al. |
| 6,910,068 | B2 | 6/2005 | Zintel et al. |
| 7,020,881 | B2 | 3/2006 | Takahashi et al. |
| 7,034,871 | B2 | 4/2006 | Parulski et al. |
| 7,103,357 | B2 | 9/2006 | Kirani et al. |
| 2001/0002845 | A1 | 6/2001 | Tamashima |
| 2001/0007107 | A1 | 7/2001 | Yamaguchi |
| 2001/0019359 | A1 | 9/2001 | Parulski et al. |
| 2001/0049648 | A1 | 12/2001 | Naylor et al. |
| 2001/0049693 | A1 | 12/2001 | Pratt |
| 2001/0054075 | A1 | 12/2001 | Miyanaga |
| 2002/0001042 | A1 | 1/2002 | Terakado |
| 2002/0032027 | A1 | 3/2002 | Kirani et al. |
| 2002/0054212 | A1 | 5/2002 | Fukuoka |
| 2002/0120693 | A1 | 8/2002 | Rudd et al. |
| 2002/0151283 | A1 | 10/2002 | Pallakoff |
| 2002/0169823 | A1 | 11/2002 | Coulombe et al. |
| 2002/0171737 | A1 | 11/2002 | Tullis |
| 2002/0194414 | A1 | 12/2002 | Bateman et al. |
| 2003/0093565 | A1 | 5/2003 | Berger et al. |
| 2003/0115277 | A1 | 6/2003 | Watanabe et al. |
| 2003/0135681 | A1 | 7/2003 | Laity et al. |
| 2003/0142215 | A1 | 7/2003 | Ward et al. |
| 2004/0078304 | A1 | 4/2004 | Gabbard et al. |

FOREIGN PATENT DOCUMENTS

| | | |
|---|---|---|
| EP | 0835013 | 4/1998 |
| EP | 0949805 A2 | 10/1999 |
| EP | 0950969 | 10/1999 |
| GB | 2289555 | 11/1995 |
| GB | 2365177 | 2/2002 |
| WO | WO-9906910 | 2/1999 |
| WO | WO9913429 | 3/1999 |
| WO | WO 9960793 A1 | 11/1999 |
| WO | WO0013429 | 3/2000 |
| WO | WO0072534 | 11/2000 |
| WO | WO 0075859 A1 | 12/2000 |
| WO | WO0101663 | 1/2001 |
| WO | WO0213031 | 2/2002 |

OTHER PUBLICATIONS

Zigon, R., "Run Length Encoding", Dr. Dobbs Journal, 1989.

Lindley, C., "JPEG-like Image Compression, Part 1", Dr. Dobbs Journal, 1995.

Lindley, C., "JPEG-like Image Compression, Part 2", Dr. Dobbs Journal, 1995.

Mann, Steve, The Wireless Application Protocol, Dr. Dobb's Journal, Oct. 1999, pp. 56-66.

Li, Jin et al., Coding artifact removal with multiscale processing, Proceedings—IEEE International Conference on Image Processing '97, Santa Barbara, CA, Oct. 27-29, 1997.

Haskell, B. G. et al., Digital Video: An introduction to MPEG-2, Chapman and Hall, pp. 80-109, 1997.

Nelson, M. et al., The Data Compression Book, Second Edition, Chapters 4 & 5, pp. 75-152, M&T Books, 1996.

Nelson, M. et al., The Data Compression Book, Second Edition, Chapter 11: Lossy Graphics Compression (portion at pp. 326-330), M&T Books, 1996.

Parker, T. et al., TCP/IP Unleashed, Chapter 2: Overview of TCP/IP, Sams Publishing, 1996.

Pennebaker, William B. et al., JPEG—Still Image Compression Standard, Chapter 16, pp. 261-266, 1993.

"UPnP Device Archticture", *Version1.0*, Contributing Members of the UPnp Forum, (Jun. 8, 2000).

"W3.ORG, Extensible Markup Language (XML) 1.0", *(second edition) specification*, (Oct. 6, 2000).

Araki, Hitoshi , et al., "A Non-Stop Updating Technique for Device Driver Programs on the IROS Platform", *IEEE*, vol. 1 (Jun. 1995), 88-92.

Corcoran, Peter M., et al., "Internet Enabled Digital Photography", *International Cobnference on Consumer Electronics*, (Jun. 22, 1999), 84-85.

Foley, James D., et al., "Computer Graphics: Priciples and Practice", *2nd Edition*, Chapter 13, Addison-Wesley Publishing Company, Reading MA, (1990), 563-604.

Gosling, J., et al., "The Java Language Environment: Contents, Sun Microsystems Computer Company", (May 1996), 82 pgs.

Kaskell, B. G., et al., "Digital Video: An Introduction to MPEG-2", *Chapman and Hall*, (1997), 80-109.

Li, Jin , et al., "Coding Artifact Removal with Multiscale Processing", *Proceedings—IEEE International Conference on Image Processing '97*, Santa Barbara, CA, (Oct. 27-29, 1997).

Lindley, Craig , "JPEG-Like Image Compression", *Part 1, Dr. Dobbs Journal*, (Aug. 1995), 1-10.

Lindley, Craig A., "JPEG-Like Image Compression", *Part 1, Dr. Dobbs Journal*, (Aug. 1995), 1-14.

Mann, Steve , "The Wireless Application Protocol", *Dr. Dobbs Journal*, (Oct. 1999), 56-66.

Nelson, M., et al., "The Data Compression Book", *Second Edition, Chapter 11, Lossy Graphics Compression*, M7T Books, (1996), 326-330.

Padmanabhan, K. , et al., "A Scheme for Data Collection from Unattended Instruments by a Computer", *IEEE*, (May 1992), 612-615.

Parker, T. , et al., "TCP/IP Unleashed", *Chapter 2, Overview of TCP/IP*, Sams Publishing, (1996).

Pennebaker, William B., et al., "JPEG—Still Compression Standard", *Chapter 16*, (1993), 261-266.

Pigeon, Steven , "Image Compression with Wavelets", *Dr. Dobbs Journal*, (Aug. 1999), 111-115.

Pilling, Michael , "Formal Specifications and Proofs of Inheritance Protcols for Real-Time Scheduling", *Software Engineering Journal*, (Sep. 1990), 263-279.

Rekimoto, et al., "CyberCode: Designing Augmented Reality Environments with Visual Tags", *Proceeding of DARE 2000 on Design Augmented Realityy Environments*, (Apr. 2000), 9 pages.

Ricoh Corporation, "Ricoh Announces New 2.3 Megapixel Digital Camera", *press release*, (Feb. 17, 1999), 1-4.

Sha, Lui , et al., "Priority Inheritance Protocols: An Approach to Real-Time Syncronization", *IEEE Transactions on Computers*, vol. 39, No. 9, (Sep. 1990), 1175-1185.

Simpson, W. (., "RFC 1661, THe Point Protocol (PPP)", (Jul. 1994).

Socolofshy, T.J. , et al., "RFC 1180: TCP/IP Tutorial", (Jan. 1, 1991), 30 pgs.

Zigon, Robert , "Run Length Encoding", *Dr. Dobb's Journal*, (Feb. 1989), 1-3.

* cited by examiner

JPEG
COMPRESSION
(48:1)

WAVELET
TRANSFORM
COMPRESSION
(48:1)

JPEG COMPRESSION (32:1)

WAVELET TRANSFORM COMPRESSION (32:1)

JPEG
COMPRESSION
(16:1)

WAVELET
TRANSFORM
COMPRESSION
(16:1)

DIGITAL CAMERA DEVICE AND METHODOLOGY FOR DISTRIBUTED PROCESSING AND WIRELESS TRANSMISSION OF DIGITAL IMAGES

RELATED APPLICATIONS

The present application claims the benefit of priority from and is related to the following commonly-owned U.S. provisional application: application Ser. No. 60/138,168, filed Jun. 8, 1999. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of digital cameras and digital image processing and, more particularly, to designs and techniques for reducing processing requirements and therefore size of digital cameras.

Today, digital imaging, particularly in the form of digital cameras, is a prevalent reality that affords a new way to capture photos using a solid-state image sensor instead of traditional film. A digital camera functions by recording incoming light on some sort of sensing mechanisms and then processes that information (basically, through analog-to-digital conversion) to create a memory image of the target picture. A digital camera's biggest advantage is that it creates images digitally thus making it easy to transfer images between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. For example, one can crop them, remove red-eye, change colors or contrast, and even add and delete elements. Digital cameras also provide immediate access to one's images, thus avoiding the hassle and delay of film processing. All told, digital photography is becoming increasingly popular because of the flexibility it gives the user when he or she wants to use or distribute an image.

The defining difference between digital cameras and those of the film variety is the medium used to record the image. While a conventional camera uses film, digital cameras use an array of digital image sensors. When the shutter opens, rather than exposing film, the digital camera collects light on an image sensor, a solid state electronic device. The image sensor contains a grid of tiny photosites that convert light shining on them to electrical charges. The image sensor may be of the charged-coupled device (CCD) or complementary metal-oxide semiconductor (CMOS) varieties. Most digital cameras employ charge-coupled device (CCD) image sensors, but newer cameras are using image sensors of the complimentary metal-oxide semiconductor (CMOS) variety. Also referred to by the acronym CIS (for CMOS image sensors), this newer type of sensor is less expensive than its CCD counterpart and requires less power.

During camera operation, an image is focused through the camera lens so that it will fall on the image sensor. Depending on a given image, varying amounts of light hit each photosite, resulting in varying amounts of electrical charge at the photosites. These charges can then be measured and converted into digital information that indicates how much light hit each site which, in turn, can be used to recreate the image. When the exposure is completed, the sensor is much like a checkerboard, with different numbers of checkers (electrons) piled on each square (photosite). When the image is read off of the sensor, the stored electrons are converted to a series of analog charges which are then converted to digital values by an Analog-to-Digital (A to D) converter, which indicates how much light hit each site which, in turn, can be used to recreate the image.

Early on during the digital imaging process, the picture information is not in color as the image sensors basically only capture brightness. They can only record gray-scale information—that is, a series of increasingly darker tones ranging from pure white to pure black. Thus, the digital camera must infer certain information about the picture in order to derive the color of the image. To infer color from this black & white or grayscale image, digital cameras use color filters to separate out the different color components of the light reflected by an object. Popular color filter combinations include, for instance, a red, green, and blue (RGB) filter set and a cyan, magenta, and yellow (CMYK) filter set. Filters can be placed over individual photosites so each can capture only one of the filtered colors. For an RGB implementation, for example, one-third of the photo is captured in red light, one-third in blue, and one-third in green. In such an implementation, each pixel on the image sensor has red, green, and blue filters intermingled across the photosites in patterns designed to yield sharper images and truer colors. The patterns vary from company to company but one of the most popular is the Bayer mosaic pattern, which uses a square for four cells that include two green on one diagonal, with one red and one blue on the opposite diagonal.

Because of the color filter pattern, only one color luminosity value is captured per sensor pixel. To create a full-color image, interpolation is used. This form of interpolation uses the colors of neighboring pixels to calculate the two colors a photosite did not record. By combining these two interpolated colors with the color measured by the site directly, the original color of every pixel is calculated. This step is compute-intensive since comparisons with as many as eight neighboring pixels is required to perform this process properly. It also results in increased data per image so files get larger.

In order to generate an image of quality that is roughly comparable to a conventional photograph, a substantial amount of information must be capture and processed. For example, a low-resolution 640×480 image has 307,200 pixels. If each pixel uses 24 bits (3 bytes) for true color, a single image takes up about a megabyte of storage space. As the resolution increases, so does the image's file size. At a resolution of 1024×768, each 24-bit picture takes up 2.5 megabytes. Because of the large size of this information, digital cameras usually do not store a picture in its raw digital format but, instead, apply compression technique to the image so that it can be stored in a standard compressed image format, such as JPEG (Joint Photographic Experts Group). Compressing images allows the user to save more images on the camera's "digital film," such as flash memory (available in a variety of specific formats) or other facsimile of film. It also allows the user to download and display those images more quickly.

During compression, data that is duplicated or which has no value is eliminated or saved in a shorter form, greatly reducing a file's size. When the image is then edited or displayed, the compression process is reversed. In digital photography, two forms of compression are used: lossless and lossy. In lossless compression (also called reversible compression), reversing the compression process produces an image having a quality that matches the original source. Although lossless compression sounds ideal, it doesn't provide much compression. Generally, compressed files are still a third the size of the original file, not small enough to make much difference in most situations. For this reason, lossless compression is used mainly where detail is extremely important as in x-rays and satellite imagery. A leading lossless compression scheme is LZW (Lempel-Ziv-Welch). This is used in GIF and TIFF files and achieves compression ratios of 50 to 90%.

Although it is possible to compress images without losing some quality, it's not practical in many cases. Therefore, all popular digital cameras use a lossy compression. Although lossy compression does not uncompress images to the same quality as the original source, the image remains visually lossless and appears normal. In many situations, such as posting images on the Web, the image degradation is not obvious. The trick is to remove data that isn't obvious to the viewer. For example, if large areas of the sky are the same shade of blue, only the value for one pixel needs to be saved along with the locations of where the other identical pixels appear in the image.

The leading lossy compression scheme is JPEG (Joint Photographic Experts Group) used in JFIF files (JPEG File Interchange Format). JPEG is a lossy compression algorithm that works by converting the spatial image representation into a frequency map. A Discrete Cosine Transform (DCT) separates the high- and low-frequency information present in the image. The high frequency information is then selectively discarded, depending on the quality setting. The greater the compression, the greater the degree of information loss. The scheme allows the user to select the degree of compression, with compression ratios between 10:1 and 40:1 being common. Because lossy compression affects the image, most cameras allow the user to choose between different levels of compression. This allows the user to choose between lower compression and higher image quality, or greater compression and poorer image quality.

One would think with present-day digital technology and scale, one could create a digital camera that is extremely small and portable, particularly since a digital camera is not constrained by the physical constraints of traditional photographic film. This is not the case today, however. As it turns out, the whole process of capturing light and generating a color digital image, such as with a digital camera, is a very compute-intensive process. Further, the resulting images stored at digital cameras today are comparatively large (e.g., image size of one-half megabyte or more is common), thus making it unattractive to download images using wireless (e.g., cellular phone) transmission. The process of recording an image on photographic film, in comparison, relies on straightforward chemical reactions, all without the need for computing resources. A digital image, however, entails a process of converting light into electrical signals, converting those electrical signals into digital or binary information, arranging that information into a visual representation, applying various digital filters and/or transformations, interpolating color from that representation, and so forth and so on. The process of rendering a meaningful digital picture is a compute-intensive undertaking, roughly equivalent in processing power to that required today for a desktop workstation, yet done so within the confines of a hand-held portable device.

The upshot of this substantial processing requirement is that, paradoxically, digital cameras today are relatively bulky devices since they require relatively large batteries to support their processing needs. This is easily seen today in camera designs. For instance, digital cameras by Sony employ large custom lithium batteries. Other camera designs employ four to six AA batteries—a fairly bulky arrangement. Even with all those batteries, digital cameras today have relatively short battery lives, such that the digital camera user is required to change out batteries at frequent intervals. Perhaps the biggest drawback of such an approach, however, is the added bulk imparted to the camera itself with such a design. Today, most of the weight of a digital camera is attributable to its batteries. Thus, present-day digital cameras, been constrained by their battery requirements, are generally no smaller or portable than their non-digital counterparts (e.g., standard 35 mm camera). And the smallest cameras today still remain film-based cameras, not digital ones, due in large part to the battery constraints of digital cameras.

Current approaches to reducing camera size have relied on improvements to the underlying silicon (e.g., microprocessor) technology. For example, one approach is that of increased integration, such as using custom chip sets that are specialized for digital cameras. Examples include, for instance, products offered by Sierra Imaging of Scotts Valley, Calif. and VLSI Vision Ltd. of Edinburgh, Scotland. The basic goal is to decrease a camera's energy requirements by super-integrating many of the digital camera's components onto a single chip, thereby realizing at least some energy savings by eliminating energy requirements for connecting external components. Another approach is to rely on ever-improving silicon technology. Over time, as silicon technology evolves (e.g., with higher transistor densities), ever-increasing compute power is available for a given energy ratio. Either approach does not address the underlying problem that a compute-intensive process is occurring at the digital camera, however. Moreover, the approaches do not address the problem that large image sizes pose to wireless transmission. As a result, the improvement afforded by increased integration or improvements in transistor density provide incremental improvement to camera size, with little or no improvement in the area of wireless transmission or downloading of images.

Moreover, as silicon technology improves, a competing interest comes into play. The marketplace is demanding better image quality and better image resolution. To the extent that improved silicon technology becomes available, that technology by and large is being applied to improving the output of digital cameras, not to decreasing their power requirements (and thereby their size). The net result is that improvements to silicon technology have resulted in better resolution but little or no change in camera size.

Another approach is to focus on improving the underlying image compression methodology itself, apart from the other aspects of image processing. For instance, one could envision a better compression technique that reduces computational requirements by reducing the amount of image data (e.g., using "lossy" compression methodology) substantially more than is presently done. Unfortunately, efforts to date have resulted in images of relatively poor quality, thus negating improvements to resolution afforded by improved silicon technology. Although future improvements will undoubtedly be made, such improvements are—like those to silicon technology—likely to be incremental.

Given the substantial potential that digital imaging holds, there remains great interest in finding an approach today for substantially decreasing the size of digital cameras and improving the downloading of images, particularly in a wireless manner, but doing so in a manner that does not impair image quality. In particular, what is needed is a digital camera that allows users to enjoy the benefits of digital imaging but without the disadvantages of present-day bulky designs with their lengthy image download transmission times. The present invention fulfills this and other needs.

SUMMARY OF THE INVENTION

A digital imaging system of the present invention implements a methodology for distributed processing and wireless transmission of digital images. The digital image system, implemented as a digital camera in the currently-preferred embodiment, includes a Sensor, a Shutter Actuator, an Image Processor, an Image (DRAM) Memory, a (Central) Processor, a Keypad and Controls, a Program Code Flash Memory, a (System) Memory, a Direct View Display, a Hot Shoe Interface, and a "Digital Film" Flash Memory. These various components communicate with one another using a bus architecture including, for instance, an Address Bus, a Data Bus, and an I/O (Input/Output) Bus.

The basic approach adopted by the present invention is to adopt techniques for reducing the amount of processing power required by a given digital camera device and for reducing the bandwidth required for transmitting image information to a target platform. Given that digital cameras exist in a highly-connected environment (e.g., one in which digital cameras usually transfer image information to other computing devices), there is an opportunity to take advantage of other processing power that is eventually going to come into contact with the images that are produced by the digital imaging device ("imager"). More particularly, there is an opportunity to defer and/or distribute the processing between the digital imager itself and the target platform that the digital imager will ultimately be connected to, either directly or indirectly. The approach of the present invention is, therefore, to decrease the actual computation that occurs at the digital imager: perform a partial computation at the digital imager device and complete the computation somewhere else—somewhere where time and size are not an issue (relative to the imager). By "re-architecting" the digital camera to defer resource-intensive computations, the present invention may substantially reduce the processor requirements and concomitant battery requirements for digital cameras. Further, the present invention adopts an image strategy which reduces the bandwidth requirements for transmitting images, thereby facilitating the wireless transmission of digital camera images.

A preferred methodology of the present invention for digital image processing includes the following steps. At the outset, an image is captured by a capture process; this may be done in a conventional manner. Next, however, the color interpolation or transformation process of conventional digital image processing is entirely avoided. Instead, the sensor image is separated into individual color planes (e.g., R, G, and B planes for an RGB color filter mosaic). Each color plane consists of all the sensor pixels imaged with the corresponding color filter. The color plane separation process requires far fewer machine instructions than the color interpolation and transformation process. The separated color plane information is referred as "luminosity information". Hence as described herein, operations on the "luminosity" image refer to operations applied to the individual color planes in the luminosity image. Next, the methodology of the present invention immediately proceeds to coding the luminosity information (i.e., the separated color planes). The present invention applies a wavelet transform process to prioritize information in the luminosity image (i.e., the color planes in the luminosity image are individually wavelet transformed). Those skilled in the art, enabled by the teachings of the present invention, will recognize that the wavelet transformation described herein could easily be replaced by other transform decompositions (e.g., Discrete Cosine Transform (DCT), such as used in JPEG) while still being compatible with the present invention.

The wavelet transform process or technique may be thought of as a process that applies a transform as a sequence of high- and low-pass filters. In operation, the transformation is applied by stepping through the individual pixels and applying the transform. This process, which creates an image that contains four quadrants, may for instance be performed as follows. First, a high-pass transform then a low-pass transform is performed in the horizontal direction. This is followed by a high-pass transform then a low-pass transform performed in the vertical direction. The upper-left quadrant is derived from a low-pass horizontal/low-pass vertical image; the lower-left quadrant comprises a high-pass horizontal/low-pass vertical image; the upper-right quadrant comprises a low-pass horizontal/high-pass vertical image; and the lower-right quadrant comprises a high-pass horizontal/high-pass vertical image. The result of this is that the information most important to the human eye (i.e., the information, that from a luminosity or black/white perspective, the human eye is most sensitive to) is in the high-priority "low/low" quadrant, that is, the upper-left quadrant which contains the low-pass horizontal/low-pass vertical image. Most of the information in the other three quadrants, particularly the lower-right quadrant, is fundamentally zero (when based as an onset of a center frequency), that is, image information that is least perceived by the human eye. Thus, the low/low quadrant is considered the highest-priority quadrant, with the remaining quadrants being considered to be of much lower priority.

In basic operation, the transform process consists of processing the image as a whole in a stepwise, linear fashion. For instance, when processing the image in a horizontal direction, one would take a horizontal vector of image data (e.g., seven horizontal neighboring pixels) and multiply that by a predetermined set of coefficients (e.g., seven coefficients for a seven-pixel vector). This yields a single pixel value. Then the process continues in a sliding-window fashion by shifting over by some number of pixel(s) (e.g., two pixels), for processing the next vector of seven horizontal neighboring pixels. The transform process may be repeated multiple times, if desired. When repeated, the process of applying high- and low-pass filters is repeated for the low/low quadrant of the then-current image (i.e., the prior result of high-pass horizontal and vertical filtering), again generating a four-quadrant image. Those skilled in the art will recognize that the filtering process can be applied to the other quadrants (e.g., low/high, and the like) as well. Further, the filtering operations can be continued recursively, further decomposing each quadrant into four sub-quadrants and so forth and so on. These quadrants are also referred to as "bands", in the image processing literature. Whether the image is transformed with a single pass or multiple passes, the end result is still a wavelet transformed image, which may then be readily compressed (e.g., using quantization, followed by entropy coding schemes like run-length encoding and Huffman coding).

After generating the wavelet transformed image, the preferred methodology of the present invention proceeds to apply quantization to the image. This process involves dividing the wavelet transformed data by a number (called the "quantization step size") to reduce the bit depth of the wavelet data. The step size can be changed for each band of the wavelet data. Typically higher frequency bands are divided by larger numbers to de-emphasize the bands. Correspondingly, the wavelet data is "dequantized," i.e., multiplied by the quantization step size during decompression (at the server/desktop). The process of quantization and dequantization involves loss of precision, and is typically the only lossy stage during compression. At this point, the image information (i.e., all quadrants and subquadrants) can be compressed as if it were fundamentally just a normal binary file. Thus, one can apply a simple, conventional compression as a compute-efficient compression process. In a preferred embodiment, the compression process is actually performed in two stages. In a first stage, run-length encoding (RLE) is applied to compress the image data. The insignificant regions of the image data (i.e., the regions that intersect high pass filters) tend to be predominantly centered around a single value; these can be compressed substantially. When applying run-length encoding to this type of information, for instance, one gets extremely long runs of similar data. Thus, in a preferred embodiment, the image data is compressed in a first stage using run-length encoding. This target result may then, in turn, be further compressed using Huffman coding, for generating a final compressed luminosity record that is suitable for storage on a digital camera and for wireless transmission.

Thus as described above, the camera-implemented portion of image processing foregoes color processing. Instead of performing compute-intensive tasks, such as color interpolations and YUV transformations, the methodology performs trivial color plane separation. This is followed by wavelet decomposition, quantization, and generic binary compression (e.g., run-length and Huffman encoding).

The end result is that the amount of processing necessary to go from a captured image to a compressed record of the captured image (i.e., a record suitable for storage on the digital camera) is substantially less than that necessary for transforming the captured image into color and then compressing it into a color-rendered compressed image. Further, the resulting compressed luminosity record, because of its increased compression ratios (e.g., relative to conventional JPEG), facilitates wireless (or other limited bandwidth) transfer of images to target platforms.

DETAILED DESCRIPTION OF A PREFERRED EMBODIMENT

The following description focuses on an embodiment of the present invention in a digital camera device, which is the currently-preferred embodiment. However, those skilled in the art will appreciate that the present invention may be embodied in other image capturing/recording/processing devices, including, for instance, video phones, closed-circuit cameras, video camcorders, or other devices capable of capturing, recording, and/or processing images. Further, the description will focus on implementation of portions of the invention in an Internet-connected environment including a desktop and server computers, such as an IBM-compatible computer running under Microsoft® Windows 2000. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, and the like. Therefore, the description of the exemplary embodiments which follows is for purposes of illustration and not limitation.

Basic System

A. Digital Camera Hardware

Figure 1A:
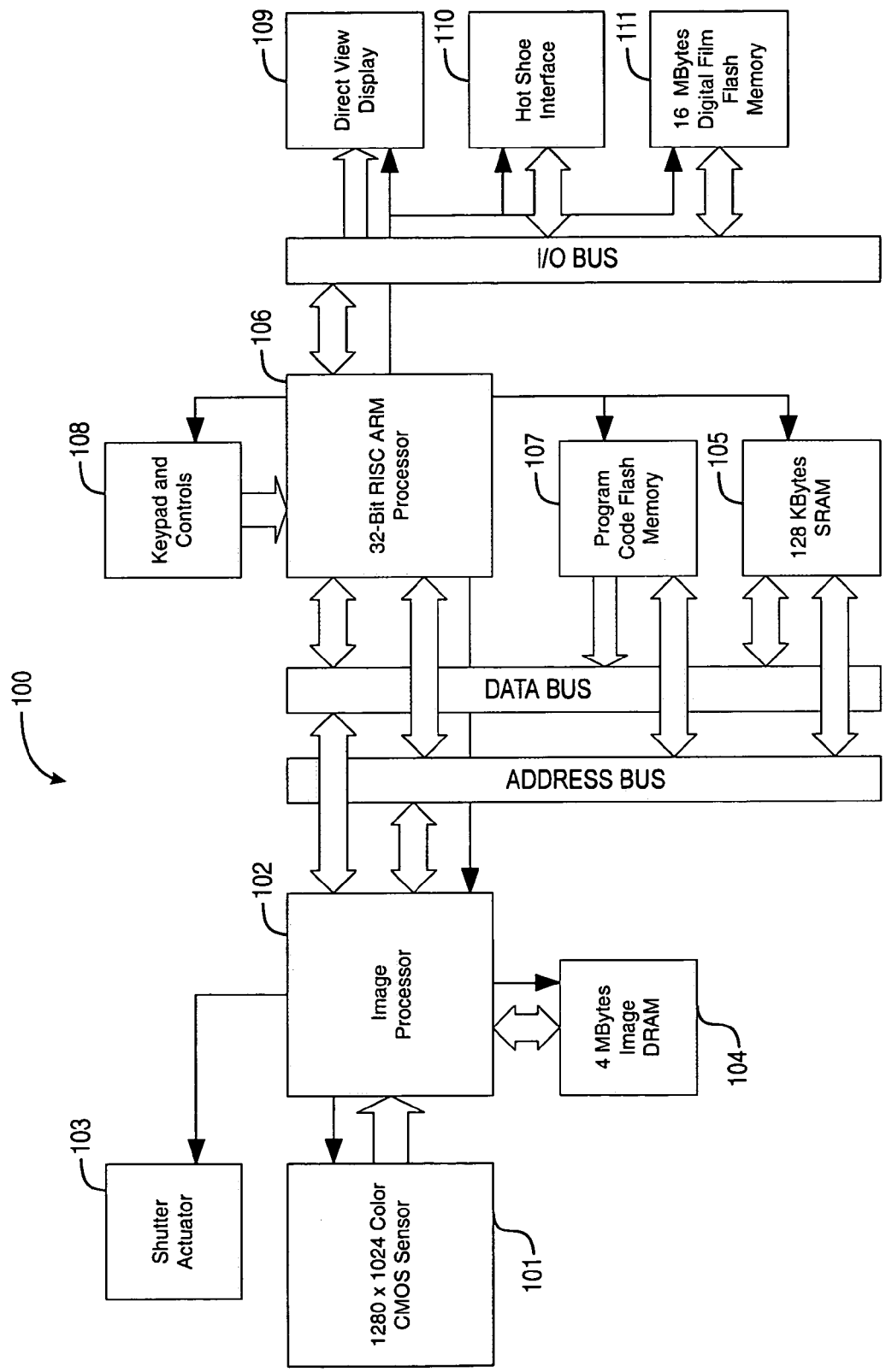
FIG. 1A is a block diagram illustrating a digital camera device suitable for implementing the present invention.

FIG. 1A is a block diagram illustrating a basic image capturing and recording system 100 suitable for implementing the present invention. For purposes of illustration, the following will focus on implementation of system 100 as a digital camera. However, as noted above, for purposes of implementing the methodology of the present invention, the system 100 may also be implemented in a variety of other digital image devices.

As shown in FIG. 1A, the system 100 includes a Sensor 101, a Shutter Actuator 103, an Image Processor 102, an Image (DRAM) Memory 104, a (Central) Processor 106, a Keypad and Controls 108, a Program Code Flash Memory 107, a (System) Memory 105, a Direct View Display or Viewfinder 109, a Hot Shoe Interface 110, and a "Digital Film" Flash Memory 111. As illustrated, these various components communicate with one another using a bus architecture including, for instance, an Address Bus, a Data Bus, and an I/O (Input/Output) Bus.

The system 100 employs the Sensor 101 for basic image capture. The Sensor 101 operates, in essence, by capturing light and transforming that into electrical voltage levels. A suitable sensor is available from a variety of vendors, including VLSI Vision, Motorola, and Toshiba. In a preferred embodiment, the Sensor 101 includes, for example, a 1280 by 1024 color CMOS sensor, such as a VLSI Vision VVL 6801 CMOS sensor. However, other sensor technology is suitable, including CCD sensors.

The Sensor 101 must, of course, be part of a larger assembly to operate. Specifically, the Sensor 101 operates in conjunction with a lens assembly (not shown), or other optics to focus an image onto the sensor. The optics themselves are controllable, for instance, using a conventional aperture, focus, and shutter control mechanisms. The currently-preferred embodiment uses an 18 mm fixed-focal length, fixed-aperture lens assembly to provide a broad depth of field. The lens assembly employs two manual slide controls, a macro lens control, and an exposure control. The macro control switches from normal to close mode by sliding a macro lens in and out of the lens assembly to provide normal or extreme close-up capability. The exposure control switches from normal to bright light by sliding a neutral gray filter in and out of the lens assembly. Aside from choosing normal or bright light, normal or close-up mode, the camera requires no manual focusing, shutter speed or aperture adjustment. Operation is as simple as point and shoot. The Sensor 101, on the other hand, operates under control of the Image Processor 102, which will now be described.

The Image Processor 102, which basically operates as a state machine, provides overall control for the Sensor 101. In operation, the Image Processor 102 controls the Sensor 101 by, in effect, telling it what to do and when. For instance, the Image Processor 102 issues timing signals to the Sensor 101 for indicating how the Sensor 101 should record and stream out image data. Further, the Image Processor 102 provides general Input/Output (I/O) control that allows one to coordinate control of the sensor with other electromechanical peripherals, such as a shutter, lens aperture, or the like.

Actual implementation of the Image Processor 102 itself may be accomplished in a variety of different ways. For a microprocessor-based implementation, for instance, the Image Processor 102 may be implemented as a microprocessor (e.g., PowerPC 823 microprocessor, available from Motorola, Inc. of Schaumburg, Ill.) with DSP (digital signal processing) logic blocks, memory control logic blocks, video control logic blocks, and interface logic. Alternatively, the Image Processor 102 may be implemented as a "camera on a chip(set)" using, for instance, a Sierra Imaging Raptor I or II chipset (available from Sierra Imaging, Inc. of Scotts Valley, Calif.), a Sound Vision Clarity 1 or 2 chipset (available from Sound Vision, Inc. of Framingham, Mass.) or similar chipset that integrates a processing core with image processing periphery. In a preferred embodiment, the Image Processor 102 preferably supports hardware implementation of a wavelet transform engine complete with a wavelet transform filter bank, so that the wavelet transform process may be pipelined through a series of dedicated hardware gates (instead of executed as a sequence of software instructions repeatedly loaded and processed by a general-purpose microprocessor).

The Image Processor 102 is not a stand-alone part but, instead, relies on the (Central) Processor 106 for control instructions. The Image Processor 102 sits on the Address and Data Buses and is accessible by the Processor 106 through a series of registers. In this manner, the Processor 106 may instruct the Image Processor 102 what to perform and when. For instance, the Processor 106 may instruct the Image Processor 102 to turn on the Sensor 101, to capture an image at the Sensor 101, and to execute the wavelet transform. Therefore, the Image Processor 102 is very much a facilitator but is not in and of itself a controller for the system.

The Shutter Actuator 103 is a simple, generic component for controlling light exposure on the Sensor 101. Depending on the behavior of the actual sensor employed, the Shutter Actuator 103 may not even be necessary. In particular, the Shutter Actuator 103 is employed in those instances where the Sensor 101 requires a black reference. In such an embodiment, the Shutter Actuator 103 is an electromechanical interface coupled to a solenoid which, when the interface responds to a particular logic level, triggers an open/close cycle of a mechanical shutter. The mechanical shutter, which serves to selectively block light entering the lens assembly of the camera, may be of a conventional design available from a variety of suppliers. A suitable supplier includes, for instance, Sunex, Inc. of Carlsbad, Calif.

The Image Memory (DRAM) 104 serves to store the image captured from the sensor. The Sensor 101 itself does not "store" the image that it captures. Therefore, the Image Memory 104 is an image capture and in-place transform (frame) buffer. This memory is controlled by the Image Processor 102 and can be shut off when not in use for power saving purposes. During basic operation of the camera, the captured image is transferred directly into the Image Memory 104, using a sample/transfer technique. In order to make this efficient, the process is controlled by the Image Processor 102 in a manner somewhat akin to DMA (direct memory access) transfer employed on desktop computers. Here, the Image Processor 102 functions as a state machine which simply samples and transfers information from the Sensor 101 to the Image Memory 104. In the presently-preferred embodiment, the Image Memory 104 comprises conventional DRAM (dynamic random-access memory) memory available from a variety of vendors, including, for instance, Toshiba, Micron, Hitachi, Samsung, and others. A size of about 4 MB (megabyte) or more is suitable for this component.

The next several components discussed, which may be viewed as components hanging off of the Address and Data Buses of the Processor 106, are typical components that one would ordinarily expect to find when implementing a data processing device; collectively, these components may be viewed as a computer embedded in the camera. For example, these components include the previously-mentioned general-purpose microprocessor (Processor 106) coupled to memory (System Memory 105 and Program Code Flash Memory 107). The Working or System Memory 105 is the general working or scratchpad memory for the Processor 106. This memory is used for storing program-created variables, stacks, heap(s), and the like. In the presently-preferred embodiment, the System Memory 105 comprises static RAM (e.g., SRAM), which is also available from a variety of vendors. A size of about 128 KB (kilobyte) or more is suitable for this purpose. The Program Code Flash Memory 107, on the other hand, comprises 1 MB of directly addressable flash storage that holds the operating system and embedded software, that is, the program code comprising the instructions that the processor must execute to operate. The flash memory, which may be conventional flash memory that is available from a variety of vendors, need not be of the removable type, as the Program Code Flash Memory 107 is not intended to be removed from the system by the camera user.

The Processor 106 itself, in the presently-preferred embodiment, comprises a 32-bit RISC ARM Processor designed by ARM Limited of Maidenhead, UK. ARM licenses its designs to semiconductor partners for manufacture, supply. and support; for a list of ARM licensees, see e.g., http://www.arm.com/Partners/. The ARM processor has an efficient instruction set that is ideal for performing cyclical functions quite rapidly and includes sufficient bandwidth for transferring large amounts of data quickly (e.g., for performing Huffman coding on a large amount of data).

Additionally, the processor is a dedicated processor, without the overhead of a substantial number of peripherals. These features make the processor attractive for use in a digital camera embodiment.

For a camera embodiment, the device will, in general, be expected to include an interface that is capable of receiving input from users. Keypad and Controls 108 are conventional inputs that support user input. Similarly, the Direct View Display ("Viewfinder") 109 is a direct view LCD (liquid crystal display) that provides feedback to the user or camera operator. During photography mode, the Viewfinder 109 replaces the plastic viewfinders and LCD panels found on most digital cameras and provides the most accurate real-time representation of the scene visualized by the sensor. The Viewfinder 109 overlays simple icons onto the image to indicate the status of various camera settings. The Viewfinder 109 fits inside an eyepiece which keeps sunlight out and allows the operator to visualize the scene in any lighting conditions. During preview mode, the Viewfinder 109 shows previews of the captured photos and allows the operator to delete unwanted photos or tag photos for wireless transmission. Thus for a camera embodiment, the Viewfinder 109 is used to provide a representation of the image that is being captured, in preview and/or post-capture fashion.

In order to provide the display image to the Viewfinder 109, the Sensor 101 is sub-sampled at a rate to create a version of the image appropriate for display. During preview processing, the system continuously captures the sensor mosaic and sub-samples the resulting mosaic for preview purposes. A histogram of the sampled luminosity is fed into a "linearization" filter to produce a balanced dynamic range for best optical perception. The scaled and "linearized" image is then displayed on the viewfinder module. The histogram data is then adjusted to match the preview image for use in linearizing the next image. The cycle is repeated continuously to provide a real time viewfinder mechanism. The Viewfinder 109 itself typically operates in conjunction with a display controller and a frame buffer (not shown), both of which may be integrated within the display component itself.

Both the Keypad and Controls and Display components, which may be conventional in nature, interface directly with the Processor 106 through general I/O (e.g., I/O Bus). Typically, such devices communicate with the microprocessor through means of interrupt requests (IRQ). Both the Keypad and Controls and Display components are available from a variety of vendors. Examples include Sharp, Toshiba, and Citizen of Japan, Samsung of South Korea, and Hewlett-Packard of Palo Alto, Calif. More customized displays are available from Displaytech, Inc. of Longmont, Colo. For an embodiment that does not need to interact with users, such as a surveillance camera, the foregoing components may be eliminated.

Additionally for a camera embodiment, it is desirable for the device to include an interface for standard peripheral devices, such as a detachable flash device. This may be provided by Hot Shoe (Accessory) Interface 110, which is a general I/O port that may comprise a serial interface of a conventional design that the camera uses to interface to its accessories via the Hot Shoe Interface. In this manner, a flash accessory can be clipped onto the camera via the Hot Shoe Interface for added illumination.

The Interface 110 combines a Serial Peripheral Interface (SPI) with a multiplexed I/O bus which provides a plug-and-play interface to a family of accessories. These accessories may include, in addition to a flash unit, a wireless holster for cellular (e.g., Motorola) phones, extra film backs for compatibility with format digital film (e.g., Sony Memory Stick or SmartMedia), a USB cradle, an RJ-11 modem cradle, a wireless cellular module, extender cables, and the like. In the currently-preferred embodiment, the interface is based on the $I^2C$-standard serial interface, which supports logic allowing the device to sense $I^2C$-compatible devices that are attached to the port. $I^2C$, which stands for Inter IC Communication, is a serial bi-directional communication protocol created by Philips Semiconductor (subsidiary of Philips Electronics, based in The Netherlands) and is used for communication between integrated circuits. Most systems have one master and several slaves that communicate using only two wires. Every device has its own identification code. If that code is sent by the master only that device will respond with an acknowledgement. After the acknowledgement, the data to be communicated is sent or received by the master. Further information about the $I^2C$ communication protocol is available from Philips Electronics of The Netherlands. As with the Keypad and Controls 108 and Direct View Display or Viewfinder 109, the Hot Shoe Interface 110 itself is not required for implementing the image capturing and processing methodology of the present invention. In the specific embodiment of a consumer product such as a camera, though, these components typically would be included.

The system includes Digital Film Flash Memory 111, which serves as the "digital film" for the system for storing compressed images. The Flash Memory 111 may comprise available flash memory removable media, such as CompactFlash, DataFlash, and Sony Memory Stick, typically in a 16 MB or larger size. Available vendors for flash memory include, for example, SanDisk of Sunnyvale, Calif. or Sony of Japan. Alternatively, the Flash Memory 111 may be affixed directly (i.e., non-removable) to the system 100. In such an embodiment, the additional bulk associated with a removable media cartridge holder and its accompanying interface may be avoided. Those skilled in the art will appreciate that the system 100 may incorporate other non-volatile memory configurations and designs that readily accommodate the image capture and processing methodology of the present invention. In general, for a consumer device embodiment, one should choose media that accommodates on the order of 100 compressed images or more.

The camera embodiment is powered by a single CR-123 lithium battery (not shown), provided with instant-on capability. Due in part to the distributed image processing approach of the present invention (present below), the camera has significant power savings over other camera designs. This gives the device not only a size and weight advantage over other cameras but also a battery life advantage.

For connectivity, the system includes a wireless holster, a USB cradle, and a modem cradle. The wireless holster physically connects the camera to a cellular phone (e.g., Motorola cellular phone) and interfaces the Hot Shoe Interface to the phone's external accessory plug. The camera can be easily pulled out of the holster for use and clipped back in for transmission. Detection of the holster and phone signal is automatic to allow for hands free transmission and there is no risk of corruption due to interruption by either loss of signal or unclipping. The camera clips into the USB cradle through the Accessory Hot-Shoe to provide rapid photo interchange to a personal computer equipped with a standard USB port. The USB cradle acts a USB slave device and therefore requires no batteries or power supply for operation and instead draws its power from the PC. The camera can also clip into a modem cradle through the Hot Shoe Interface. The modem cradle allows the camera to transmit images to the PhotoServer via a land line connection (e.g., 33.6 KBps) via a standard RJ-11 phone jack. The modem cradle is powered by the battery in the camera.

The specifications for the currently-preferred camera embodiment may be summarized as follows.

TABLE 1

Miniature Wireless Digital Camera specifications:

| | |
|---|---|
| Sensor: | 1.3 Mega-Pixel Color CMOS |
| Optics: | 18 mm Fixed Focal Length, Fixed Aperture |
| Exposure Control: | Automatic, Macro Mode, Indoor/Outdoor Mode |
| Processor: | ARM 32-bit RISC |
| Chipset: | Image Processor (Lightsurf PhotonOne) |
| Memory: | 4 Mbytes DRAM + 128 Kbytes SRAM |
| Digital Film: | 16 Mbytes Internal Flash Film |
| File Format: | Progressive Photograph Format (PPF) |
| Wireless Protocol: | communication protocol, such as packet-based TCP/IP, WAP, or the like |
| Battery: | CR-123 |
| Accessory Interface: | Accessory Hot-Shoe |
| Accessores: | Flash Unit, Extra Film Back, Motorola Cellular Holster, USB Cradle, Modem Cradle |

B. Basic Computer Hardware (e.g., for Desktop and Server Computers)

Figure 1B:
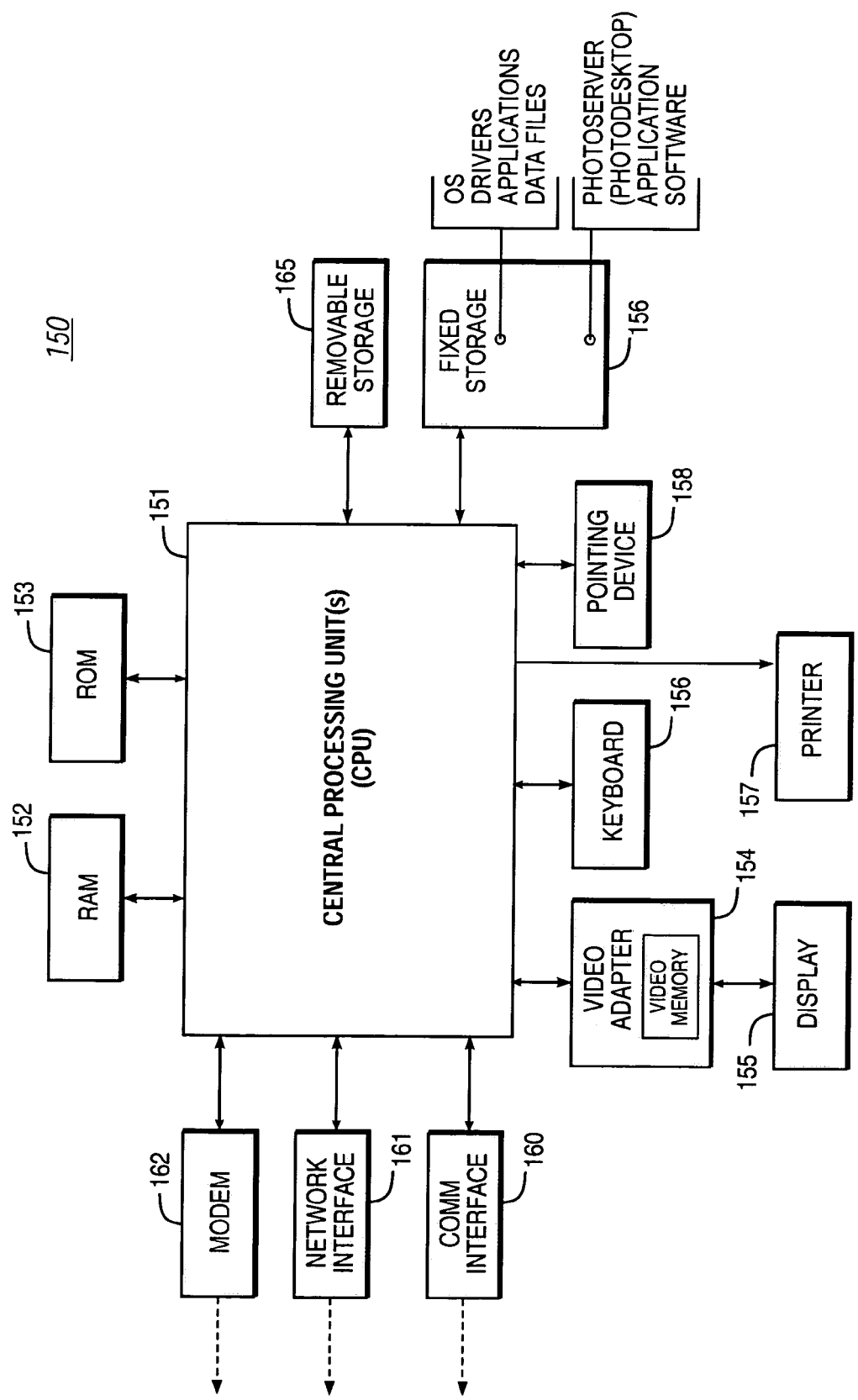
FIG. 1B is a block diagram illustrating a digital computer suitable for implementing distributed processing portions of the present invention.

Portions of the present invention may be implemented on a conventional or general-purpose computer system, such as an IBM-compatible personal computer (PC) or server computer. FIG. 1B is a very general block diagram of an IBM-compatible system 100, which is adapted to include portions of the distributed image processing of the present invention. As shown, system 150 comprises a central processor unit(s) (CPU) 151 coupled to a random-access memory (RAM) 152, a read-only memory (ROM) 153, a keyboard 156, a pointing device 158, a display or video adaptor 154 connected to a display device 155, a removable (mass) storage device 165 (e.g., floppy disk), a fixed (mass) storage device 166 (e.g., hard disk), a communication port(s) or interface(s) 160, a modem 162, and a network interface card (NIC) or controller 161 (e.g., Ethernet). Although not shown separately, a real-time system clock is included with the system 150, in a conventional manner.

CPU 151 comprises a processor of the Intel Pentium® family of microprocessors. However, any other suitable microprocessor or microcomputer may be utilized for implementing the present invention. The CPU 151 communicates with other components of the system via a bi-directional system bus (including any necessary I/O controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 152 serves as the working memory for the CPU 151. In a typical configuration, RAM of sixteen megabytes or more is employed. More or less memory may be used without departing from the scope of the present invention. The read-only memory (ROM) 153 contains the basic input output system code (BIOS)—a set of low-level routines in the ROM that application programs and the operating systems can use to interact with the hardware, including reading characters from the keyboard, outputting characters to printers, and so forth.

Mass storage devices 165, 166 provide persistent storage on fixed and removable media, such as magnetic, optical or magnetic-optical storage systems, or flash memory, or any other available mass storage technology. The mass storage may be shared on a network, or it may be a dedicated mass storage. As shown in FIG. 1B, fixed storage 166 stores a body of program and data for directing operation of the computer system, including an operating system, user application programs, driver and other support files, as well as other data files of all sorts. Typically, the fixed storage 166 serves as the main hard disk for the system and stores application software implementing the PhotoServer (PhotoDesktop) component described below.

In basic operation, program logic (including that which implements methodology of the present invention described below) is loaded from the storage device or mass storage 166 into the main (RAM) memory 152, for execution by the CPU 151. During operation of the program logic, the system 150 accepts user input from a keyboard 156 and pointing device 158, as well as speech-based input from a voice recognition system (not shown). The keyboard 156 permits selection of application programs, entry of keyboard-based input or data, and selection and manipulation of individual data objects displayed on the display screen 155. Likewise, the pointing device 158, such as a mouse, track ball, pen device, or the like, permits selection and manipulation of objects on the display screen. In this manner, these input devices support manual user input for any process running on the system.

The computer system displays text and/or graphic images and other data on the display device 155. Display device 155 is driven by the video adapter 154, which is interposed between the display 155 and the system. The video adapter 154, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 150, may be obtained from the printer 157, or other output device. Printer 157 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 161 connected to a network (e.g., Ethernet network), and/or modem 162 (e.g., 56K baud, ISDN, DSL, or cable modem), examples of which are available from 3Com of Santa Clara, Calif. The system 150 may also communicate with local occasionally-connected devices (e.g., serial cable-linked devices) via the communication ("comm") interface 160, which may include a RS-232 serial port, a Universal Serial Bus (USB) interface, or the like. Devices that will be commonly connected locally to the interface 160 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Mackintosh), which are available from Apple Computer of Cupertino, Calif., and Sun Solaris workstations, which are available from Sun Microsystems of Mountain View, Calif.

The above-described system 150 is presented for purposes of illustrating the basic hardware underlying desktop and server computer components that may be employed in the system of the present invention. For purposes of discussion, the following description will present examples in which it will be assumed that there exists a "server" or remote device having information of interest to the ultimate end-user. The present invention, however, is not limited to any particular environment or device configuration. In particular, a server distinction is neither necessary to the invention, but is used to provide a framework for discussion. Instead, the present invention may be implemented in any type of computer system or processing environment capable of supporting the methodologies of the present invention presented in detail below.

C. Basic System Software

Figure 2:
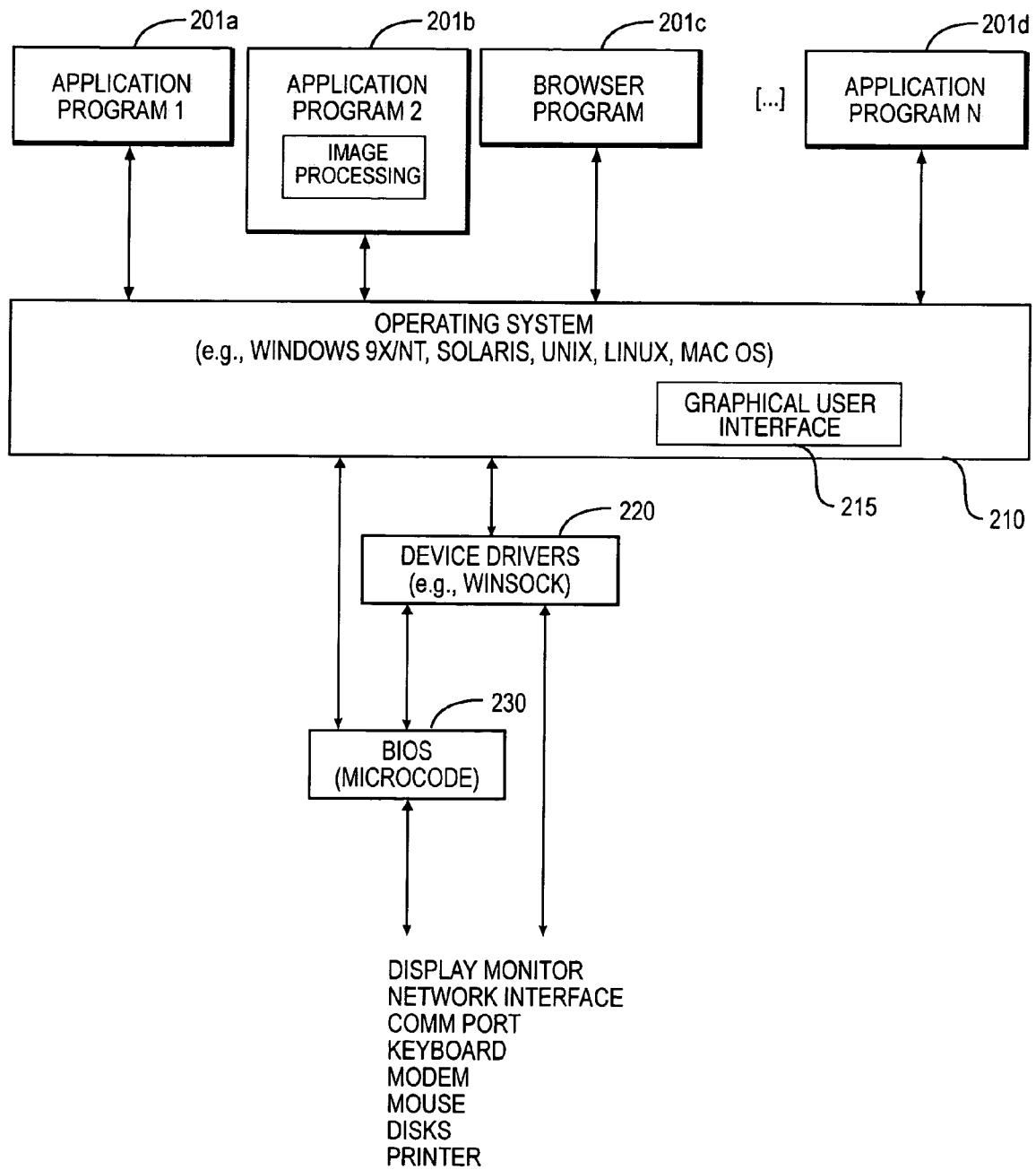
FIG. 2 is a block diagram of a software system suitable for controlling the computer of FIG. 1B.

Illustrated in FIG. 2, a computer software system 200 is provided for directing the operation of the computer system 150. Software system 200, which is stored in system memory 152 and on fixed storage (e.g., hard disk) 166, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c), including image processing software, may be "loaded" (i.e., transferred from fixed storage 166 into memory 152) for execution by the system 150.

System 200 includes a graphical user interface (GUI) 215, for receiving user commands and data in a graphical (e.g., "point-and-click") fashion. These inputs, in turn, may be acted upon by the system 150 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver) and the system BIOS microcode 230 (i.e., ROM-based microcode), particularly when interfacing with peripheral devices. OS 210 can be provided by a conventional operating system, such as Microsoft® Windows 9x, by Microsoft® Windows NT, or by Microsoft® Windows 2000, all available from Microsoft Corporation of Redmond, Wash. Alternatively, OS 210 can also be an alternative operating system, such as IBM OS/2 (available from IBM of Armonk, N.Y.) or Macintosh OS (available from Apple Computers of Cupertino, Calif.).

Distributed Digital Image Processing

A. Basic Design Consideration

The basic approach adopted by the present invention is to adopt techniques for reducing the amount of processing power required by a given digital camera device and for reducing the bandwidth required for transmitting image information to a target platform. Every digital imaging device is inherently connected. Consider, for instance, a digital camera. It does not necessarily appear to be a "connected" device, as it may initially give the appearance of an end-to-end solution, where one is capturing an image, processing that image, and then storing it on digital film. In reality, however, the true end product is some type of output, such as a printed image used in a document. As it turns out, somewhere along the way the image is taken off the device and transmitted to yet another computing device, such as a server or desktop computer, where, for instance, the image may be cropped, touched up, or otherwise processed. Therefore, a digital image—due to the fact that it is digital, is inherently related to all other types of computing devices that can handle images. Given that environment in which digital cameras exist, there is an opportunity to take advantage of other processing power that is eventually going to come into contact with the images that are produced by the digital imaging device ("imager"). More particularly, there is an opportunity to defer and/or distribute the processing between the digital imager itself and the target platform that the digital imager will ultimately be connected to, either directly or indirectly. Therefore, rather than attempting to invent a revolutionary way to get better hardware performance (i.e., better silicon technology) or a revolutionary compression technique, the approach of the present invention is to decrease the actual computation that occurs at the digital imager: perform a partial computation at the digital imager device and complete the computation somewhere else—somewhere where time and size are not an issue (relative to the imager). In other words, recognizing that the images captured by a digital camera will typically end up on another computing device, the approach of the present invention is to take advantage of that fact by "re-architecting" the digital camera to defer resource-intensive computations, thereby substantially eliminating the processor requirements and concomitant battery requirements for digital cameras. Further, the present invention adopts an image strategy which facilitates transmission of images, thereby facilitating the wireless transmission of digital camera images.

For purposes of determining how to defer and/or distribute processing, the overall process of digital imaging, from capturing a light image to storing a digital representation of that image, may itself be viewed as comprising various subprocesses. Once individual subprocesses are identified, one can investigate various approaches for deferring and/or distributing those subprocesses to other devices. Consider, for instance, a decision to defer image compression. Such an approach entails immediate problems, however. The digital camera must have sufficient resources to store, at least temporarily, uncompressed images, which tend to be quite large in size. Although storage technology (e.g., flash memory) can be expected to have ever-increasing capacity, present-day storage technology makes that approach unattractive, if not impractical. Another difficulty posed by that approach is that the digital camera must exchange images in an uncompressed format with the target device (e.g., desktop computer). Again, such an approach is unattractive since it would require the user to spend an inordinate amount of time transferring images to the target device, given the limited bandwidth that is commercially feasible for downloading pictures from a digital camera. Therefore, an approach of eliminating compression is not attractive, unless one can somehow obtain massive storage and bandwidth capacity for the digital camera. The immediate challenge posed by a deferred/distributed processing approach, therefore, is how one can accomplish the approach in a manner that does not contradict the ultimate goal of obtaining quality digital images on a portable digital camera. To address this challenge, the entire imaging process, including its individual elements, is examined in order to figure out how the process can be reproduced in a manner that compute-intensive portions of the process are performed somewhere other than the digital camera itself, but done so in a manner that does not compromise the image information necessary for reconstructing a digital image of acceptable quality.

B. Distributed Image Processing

As illustrated in FIG. 1B, the imaging process approach of the present invention includes a rapid foreground process to capture and compress the image (e.g., one second cycle) and a slower background process to further compress and transmit the image. The foreground process is optimized for speed to facilitate continuous rapid snapshots while the background process is optimized for power. As shown, the two-stage processing mechanism is assisted by an imaging processing server, the "PhotoServer," which typically includes Internet connectivity.

The first stage, the foreground stage, is performed in the camera itself. This stage produces a highly-compressed image based on wavelet transform technology. This image is stored on the 16 MB of digital film inside the camera. The image is then transmitted to the PhotoServer (target platform) via a packet-based protocol as a Progressive Photograph Format (PPF) file. Suitable protocols include, for instance, Transmission Control Protocol/Internet Protocol (TCP/IP) and Wireless Application Protocol (WAP). For a description of TCP/IP, see e.g., Parker, T. et al., *TCP/IP Unleashed*, Sams Publishing, p. 33 et. seq., the disclosure of the reference in its entirety being hereby incorporated by reference. For a description of WAP, see e.g., Mann, S., *The Wireless Application Protocol*, Dr. Dobb's Journal, pp. 56-66, October 1999, the disclosure of which is hereby incorporated by reference.

The PPF mechanism allows selective transmission of varying degrees of photographic significance while maintaining the remaining elements of significance on the digital film in the camera. A lower quality image transmitted to the server can later be upgraded to a higher quality version simply by synchronizing the remaining elements of significance stored in the PPF file. The second stage of the process, the background stage, is performed on the PhotoServer. This stage completes the image processing cycle and produces a high quality, color-balanced, compressed image in a standard file format such as JPEG. A similar second stage process also exists in a desktop implementation, the Photo-Desktop, for customers who wish to transfer images to a desktop computer (as the target platform) using a USB (universal serial bus) cradle accessory or other communication link.

Figure 3A:
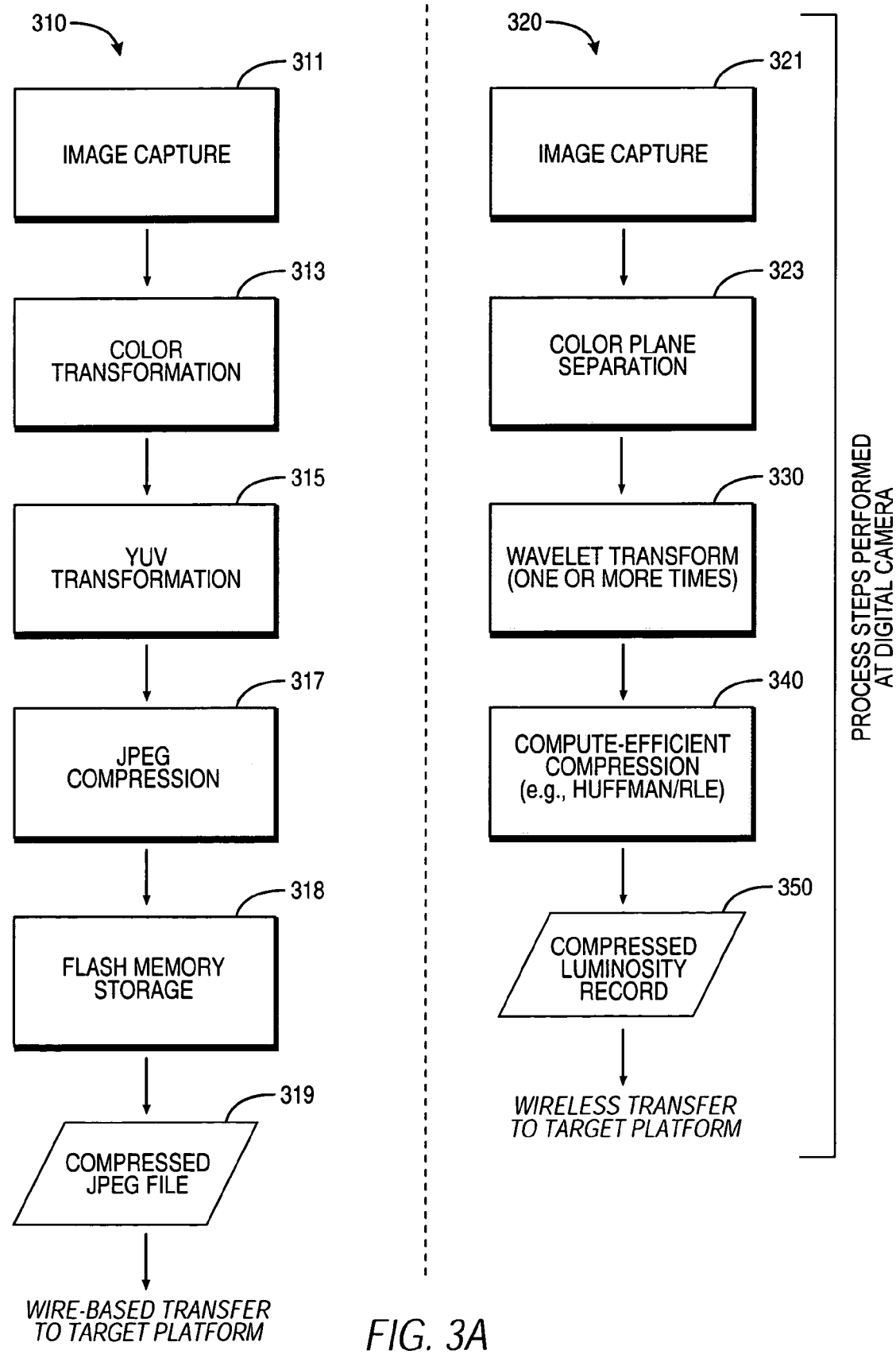
FIG. 3A is a block diagram illustrating a methodology of the present invention for distributed digital image processing (including contrasting it with conventional digital image processing).

Detailed construction and operation of the foregoing is perhaps best described by way of comparison with conventional digital image processing. FIG. 3A illustrates on its left-hand side a high-level process or methodology 310 that comprises the individual processes (i.e., subprocesses) or steps routinely employed for digital image processing. The digital imaging process or sequence 310 begins with image capture, as represented by capture block or capture process 311. This is the process of capturing light data (image) from a sensor and, in response, generating digital representations of that data (i.e., digital light levels based on the captured image). This is, in effect, an in-memory image of the light which has entered the camera's lens and struck the camera's CCD or CMOS sensor. It is interesting to note that at this point the digital camera has only captured light levels. Color information per se does not yet exist. Instead, color information, which must be inferred, is not determined yet at this point in the digital imaging process.

The capture process 311 is conventionally followed by a color interpolation (transformation) process 313, where color information may indeed be determined and applied to the image. In practice, the camera is able to infer color information based on captured luminance data and information that it knows about the individual pixels and where they lie within a matrix of color (pixels) that cover the surface of the camera's sensor. This information is now applied to the image by the color interpolation process 313, which is a compute-intensive process.

Because the human eye is more perceptive to certain colors than others, further processing of the image is required. The standard color space that the device "sees" the image in (e.g., RGB color space or model) is not necessarily the way that the human eye would view the image. For instance, the human eye has a certain distribution of retinal cones that are more sensitive to certain wavelengths of light. Therefore, in an effort to better match that expected by the human eye, YUV transformation process 315 maps or translates the image (e.g., RGB-based image) into YUV color space, a color model which takes into account luminance and chrominance. In YUV, Y is the luminance component, and U and V are the color or chrominance components. Luminance serves as a quantitative measure of brightness. Chrominance, on the other hand, reflects the difference in color quality between a color and a reference color that has an equal brightness and a specified chromaticity. In essence, the YUV transformation process 315 is a matrix transformation. Here, the red, green, and blue (RGB) values that apply to a particular piece of pixel data are multiplied by a vector which, in turn, translates the values into YUV color space. Although the individual transformation itself is not particularly complicated, the YUV transformation process 315 is applied to every pixel of the image and, thus, consumes a lot of processing cycles. Accordingly, the YUV transformation process 315 itself is also compute intensive.

Now, the image may be compressed as represented by compression process 317. The basic approach applied in image compression is to prioritize by the image data according to how a human eye would normally see it. In lossy image compression technique (e.g., JPEG), the chrominance levels that are less important to the human eye are compressed out. Luminance, which the human eye is more sensitive to, is given priority in the compression. Lossy techniques, which function largely by eliminating information that is the least significant to the human eye, are described in the technical, trade, and patent literature. See e.g., Nelson, M. et al., *The Data Compression Book*, Second Edition, Chapter 11: Lossy Graphics Compression (particularly at pp. 326-330), M&T Books, 1996. Also see e.g., *JPEG-like Image Compression* (Parts 1 and 2), Dr. Dobb's Journal, July 1995 and August 1995 respectively (available on CD ROM as *Dr. Dobb's/CD Release* 6 from Dr. Dobb's Journal of San Mateo, Calif.). The disclosures of the foregoing are hereby incorporated by reference.

After the foregoing lossy image capture process, the now-compressed image may be stored on persistent media. As indicated by processing block 318, conventional flash memory (or other suitable media) may be employed for this purpose, such as any one of the flash memory varieties previously mentioned. The end result is a compressed JPEG file 319, as shown.

The design goal of digital cameras today is to generate at the digital camera itself complete color images that are compressed in a standard image format (e.g., JPEG). This sequence, however, incurs multiple compute-intensive processes, including the color transformation process 313, the YUV transformation process 315, and the compression process 317, with the end result being a relatively-large image that is not well-suited for wireless transmission. In accordance with the teachings of the present invention, however, the foregoing design goal is not adopted. Note that the very color images that have been processed, at great computational expense, into a standard image format at the digital camera will ultimately be transferred to another device—another piece of computing hardware. If one assumes, for instance, that the images do not necessarily have to be exactly a color JPEG (or other standard image format) while stored on the digital camera, but that the images will be a color JPEG ultimately (e.g., target device), then one can begin to defer some of the processes required for processing digital images. In accordance with the present invention, image processing of a digital camera is performed in such a manner so as to retain the advantage of compression at the digital camera but remove the compute-intensive components of the process, so that they may be performed elsewhere (other than the digital camera itself). This process will now be described in further detail.

The approach of the present invention exploits the fact that there is really no such thing as "color sensitivity" on the digital camera. Instead, the camera uses a color inference transformation that employs a mosaic pattern of color pixels overlaid on a light-level sensor (e.g., CCD or CMOS sensor). For instance, as light shines through a red tile on the mosaic, it lights up the light-sensing element behind it. That element, in turn, records the luminosity observed. The digital camera may then employ its internal knowledge of the mosaic pattern—the specific arrangement of red, green, and blue pixels (of which there are a variety of standard patterns)—to infer the actual color. Each pattern itself tends to be a small, repeating pattern that is capable of being represented with a small amount of data. For example, a Bayer pattern will consist of a 2×2 pixel section (four pixels total) of two green pixels on one diagonal and a red and blue on another diagonal that is repeated over and over again. A simplistic approach to using the light information arriving at a particular pixel section is to merge together (i.e., matrix transformation) the information to produce four pixels having the same RGB level, at one quarter the resolution, but with accurate color data. Another approach is to take into account the luminosity observed at each of the pixels, so that not only is color information incorporated into the image processing but also the sharpness that is being perceived by each sensor as well.

The color interpolation process does not itself enhance the image data. Although it is certainly required for ultimately rendering a color image, it itself need not necessarily be performed at the digital camera and can therefore be deferred. Stated differently, if the knowledge of the color pattern can be placed somewhere else and the color image need not be completely generated right away (i.e., at the digital camera), then the step or process of transforming the originally-captured image into a color image may be deferred. In accordance with the present invention, the color interpolation and transformation process is in fact deferred altogether. Instead, the R, G, B color planes are separated and compressed. The compressed images are packaged into a single stream with header information to identify the individual bit-streams. The combined bit-stream may then be transmitted to the target device, with a small descriptor of what Bayer pattern should be applied either being transmitted to or being assumed by the target device.

The right-hand side of FIG. 3A illustrates a preferred methodology 320 for digital image processing in accordance with the present invention. At the outset, an image is captured by capture process 321, in a manner similar to that previously described for capture process 311. At the moment the shutter button is depressed, the sensor captures a full detail mosaic in two phases. The first phase is captured with the mechanical shutter closed, the second with the shutter open. Both phases happen in rapid succession, with the first being used to normalize the black level of the second. The mosaic is then fed into a linearization filter using the coefficients from the last preview frame prior to shutter click and serialized to DRAM. The image is also scaled to match the operator selected image capture resolution. Any aberrant pixel data should fall outside of the dynamic range provided by the histogram and consequently be canceled out.

Next, the color interpolation or transformation process is entirely avoided. Instead, the methodology 320 immediately moves to extraction of the color planes, shown as color plan separation process 323, followed by a wavelet transform process 330 to prioritize information in the color planes. Here, the separated color planes are fed into a wavelet transform image—that is, a preferably hardware-implemented (for performance) wavelet transform process. Over a series of repeated cycles, the wavelet engine transforms the luminosity image in place in DRAM.

The wavelet transform process itself may be thought of as a process that applies a transform as a sequence of high- and low-pass filters. In operation, the transformation is applied by stepping through the individual pixels and applying the transform. This process, which creates an image that contains four quadrants, may for instance be performed as follows. First, a high-pass transform then a low-pass transform is performed in the horizontal direction. This is followed by a high-pass transform then a low-pass transform performed in the vertical direction. The upper-left quadrant is derived from a low-pass horizontal/low-pass vertical image; the lower-left quadrant comprises a high-pass horizontal/low-pass vertical image; the upper-right quadrant comprises a low-pass horizontal/high-pass vertical image; and the lower-right quadrant comprises a high-pass horizontal/high-pass vertical image. The result of this is that the information most important to the human eye (i.e., the information that, from a luminosity or black/white perspective, the human eye is most sensitive to) is in the high-priority "low/low" quadrant, that is, the upper-left quadrant which contains the low-pass horizontal/low-pass vertical image. Most of the information in the other three quadrants, particularly the lower-right quadrant, is fundamentally zero (when based as an onset of a center frequency), that is, image information that is least perceived by the human eye. Thus, the low/low quadrant is considered the highest-priority quadrant, with the remaining quadrants being considered to be of much lower priority.

The transform is a completely reversible process, such that the original image (luminosity record) may be restored without loss of information. In practice, however, some information is lost as a result the process being performed digitally, as digital computing devices are of course only able to perform real number math with finite, not infinite, precision. Nevertheless given enough digital significance (that is typically available with processors today), this loss is imperceptible to the human eye. The human eye is perceptive only to a bit depth in the range of about five to six significant bits of image data (based on a certain center frequency). As a result, processing the image with even modest processing capability (e.g., a bit depth of 16 significant bits) generates a transform that is reversible in a manner that is not perceptible to the human eye. Here, the image data is arranged without any reliance on color in such a way that the information most important to the human eye is one-quarter of its original size. If desired, the best-perceived quadrant (e.g., the upper-left quadrant for the example sequence above) may be used as a basis to provide the user with a black and white image at the digital camera (e.g., for preview purposes).

In basic operation, the transform process consists of processing the image as a whole in a stepwise, linear fashion. For instance, when processing the image in a horizontal direction, one would take a horizontal vector of image data (e.g., seven horizontal neighboring pixels) and multiply that by a predetermined set of coefficients (e.g., seven coefficients for a seven-pixel vector). This yields a single pixel value. Then the process continues in a sliding-window fashion by shifting over by some number of pixel(s) (e.g., two pixels), for processing the next vector of seven horizontal neighboring pixels. Further description of the wavelet transform process may be found, for instance, in the technical and trade literature. See e.g., Pigeon, S., *Image Compression with Wavelets*, Dr. Dobb's Journal, August 1999, pp. 111-115. The disclosure of the foregoing is hereby incorporated by reference, for all purposes.

Figure 3B:
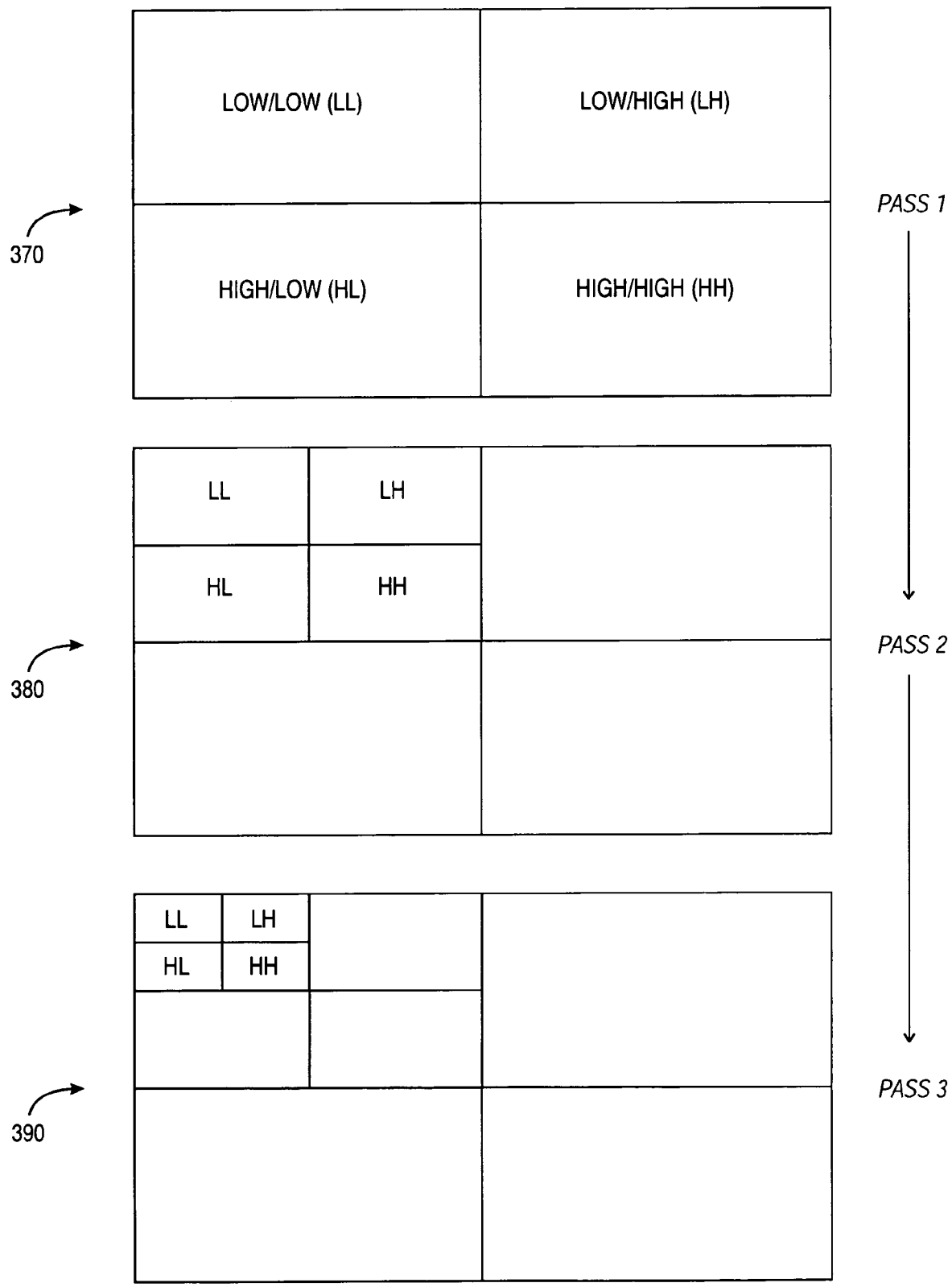
FIG. 3B is a block diagram illustrating a multi-pass wavelet transform process.
Figure 3C:
FIGS. 3C-I are black & white photographic images that compare the results of JPEG compression with wavelet transform.
Figure 3D:
Figure 3E:
Figure 3F:
Figure 3G:
Figure 3H:
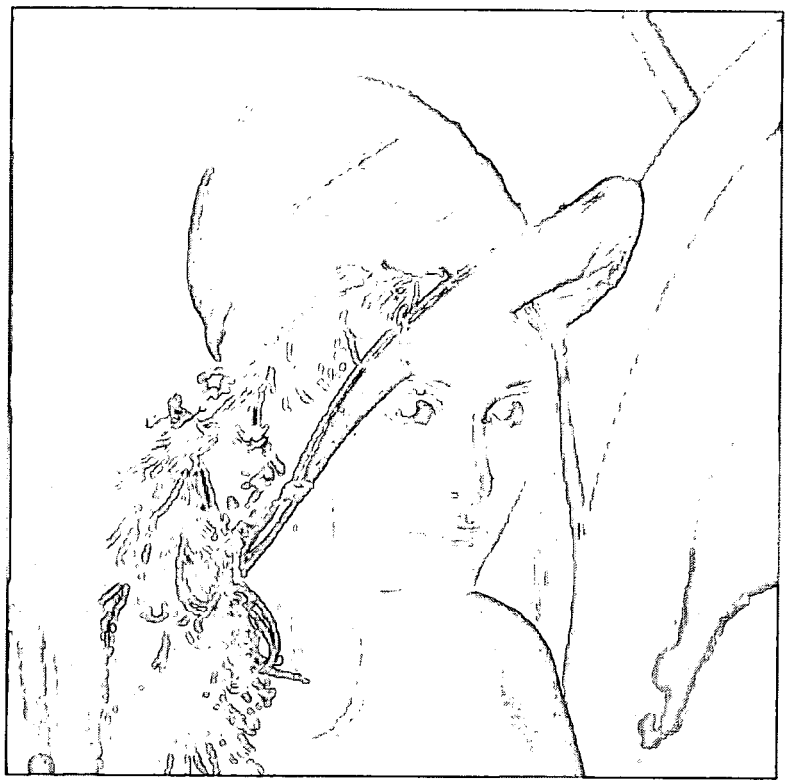
Figure 3I:

As illustrated in FIG. 3B, the wavelet transform process may be repeated multiple times, if desired. When repeated, the process of applying high- and low-pass filters is repeated for the low/low quadrant of the then-current image (i.e., the prior result of high-pass horizontal and vertical filtering), again generating a four-quadrant image. For instance, as shown in FIG. 3B, the wavelet transformed image 370, which has already undergone a first pass of the wavelet transform, is subjected to another pass of the wavelet transform process to generate wavelet transformed image 380—that is, an image that has undergone two rounds of wavelet transformation. The process may continue in this fashion, for example, generating wavelet transformed image 390. Each time, the subsequent pass is performed on the prior-resulting low/low quadrant. Those skilled in the art will recognize that other quadrants could also be decomposed in a similar manner. This process may continue recursively until the desired transformed image is obtained. Whether the image is transformed with a single pass or multiple passes, the end result is still a wavelet transformed image. This image is "quantized" (i.e., reduced in bit-depth) by dividing the wavelet coefficients (i.e., the numerical value of the pixels in the wavelet transformed image) by a quantization scale factor. The quantization can differ from one band to another. The quantizations step sizes will be included in compressed bit-stream and will be used by the decompression system (e.g., on the desktop/server) to reverse the above process. Note that quantization and dequantization leads to loss of precision in the wavelet data and represents the lossy part of the compression. After quantization, the wavelet coefficients are compressed losslessly by one of several generic binary compression techniques (e.g., bit-plane decomposition of bands, followed by arithmetic coding).

After generating the wavelet transformed image, therefore, the preferred methodology 320 of the present invention proceeds to apply compression to the image. At this point, the image information (i.e., all quadrants and subquadrants) can be compressed as if it were fundamentally just a normal binary file. Thus, one can apply a simple, conventional compression, as a compute-efficient compression process, as indicated by compression process 340. In a preferred embodiment, the compression is performed in succession stages. First, run-length encoding (RLE) is applied to compress the image data. RLE itself is a simple, well-known technique used to compress runs of identical symbols in a data stream. The insignificant regions of the image data (i.e., the low-priority quadrants) tend to be predominantly centered around a single value; these can be compressed substantially. When applying run-length encoding to this type of information, for instance, one gets extremely long runs of similar data. The image is serialized to flash memory during the encoding process to free the DRAM for the next image capture. The entire cycle from image capture through stage one compression and serialization to flash is rapid (e.g., less than one second) for the highest quality mode. The camera is then ready to take another photograph. RLE, which typically encodes a run of symbols as a symbol and a count, is described in the patent, technical, and trade press; see, e.g., Zigon, Robert, *Run-Length Encoding*, Dr. Dobb's Journal, February 1989 (available on CD ROM as *Dr. Dobb's/CD Release* 6 from Dr. Dobb's Journal of San Mateo, Calif.), the disclosure of which is hereby incorporated by reference. In addition to RLE, the methodology 320 may include discarding low priority data in order to provide more-aggressive lossy compression.

This target result may then, in turn, be further compressed using Huffman coding, for generating a final compressed luminosity record 350 that is suitable for storage on a digital camera and for wireless transmission. Huffman coding is a method of encoding symbols that varies the length of the symbol in proportion to its information content. Symbols with a low probability of appearance are encoded with a code using many bits, while symbols with a high probability of appearance are represented with a code using fewer bits. Huffman coding is described in the patent, technical, and trade press; see, e.g., Nelson, M. et al., *The Data Compression Book*, Second Edition, Chapters 4 and 5, M&T Books, 1996, the disclosure of which is hereby incorporated by reference.

The wavelet transform-based compression used in the digital camera 100 achieves significantly better image quality than traditional JPEG compression used in other digital cameras. The image comparisons presented in FIGS. 3C-I illustrate this. The standard reference image for compression algorithms is the Lena image, shown in FIG. 3C in original uncompressed detail. The following image sets illustrate the resulting relative image degradation of wavelet and JPEG techniques for varying compression ratios. At an ultra-aggressive 48:1 compression ratio, the Lena image is still of reasonable quality using wavelet transform (FIG. 3E) while JPEG (FIG. 3D) has generated unacceptable pixelization. At a compression ratio of 32:1, the Lena image is showing better edge detail with wavelet transform (FIG. 3G) while JPEG (FIG. 3F) is still largely pixelized and unacceptable. At a compression ratio of 16:1, the fast quality compression ratio, wavelet transform (FIG. 3I) has produced a good quality image with good edge definition and few noticeable artifacts. JPEG (FIG. 3H), on the other hand, is barely approaching an acceptable image comparable with a wavelet ratio of 32:1 or more. Thus, the foregoing demonstrates that the wavelet transform-based compression technique produces far better shade continuity and edge detail than equivalent JPEG.

Thus as described above, the camera-implemented portion of image processing (i.e., methodology 320) foregoes color processing. Instead of performing YUV transformation, the methodology performs wavelet transform compression on an image comprising a luminosity record. Further, JPEG-style compression, which is fairly compute-intensive, has been removed. Instead, the methodology 320 applies generic binary compression (e.g., run-length encoding and Huffman coding), which is far less compute-intensive. Note in particular that, up to this point, image compression in accordance with the present invention has been performed in a manner which is largely lossless, not lossy. Loss of image information at this point, which is quite small, is due only to digital rounding errors. If desired, however, additional compression techniques, including lossy ones, may be applied (e.g., at additional compression process 340). For instance, the image may be further compressed by reducing the bit depth in the low priority quadrants.

The end result is that the amount of processing necessary to go from a captured image to a compressed record of the captured image (i.e., a record suitable for storage on the digital camera) is substantially less than that necessary for transforming the captured image into color and then compressing it into a color-rendered compressed image. Further, the resulting compressed luminosity record, because of its increased compression ratios (e.g., relative to conventional JPEG), facilitates wireless (or other limited bandwidth) transfer of images to target platforms.

The compressed luminosity record 350 is of course optimized for generation and storage on a digital camera, not for viewing by the user. Thus at the point where the compressed luminosity record 350 is transferred to another computing device (e.g., images downloaded to a desktop computer), image processing crosses over the distributed boundary to continue image processing on the target platform. In the currently-preferred embodiment, this is done via wireless transmission. Whenever the camera is connected to the cellular holster via the Hot-Shoe clip, a background process is initiated to transmit any pending compressed PPF photographs to the PhotoServer for final processing. The process is transparent to the user, requiring no operator intervention and can occur while the camera is in low power mode. Using WPTP as the transport layer, the process can be interrupted at any time without worry of any data corruption or need to re-send already transmitted packets.

Estimates for wireless transmission times follow in the tables below. These estimates are shown with varying operator-selectable image resolution and varying operator selectable image quality. Image quality is a factor of compression ratio. As compression ratios increase, more loss of significant image data occurs.

TABLE 2

Wireless transmission times assuming a 10 Kbps transmission rate

| | Resolution | | |
|---|---|---|---|
| Quality | Photographic 1280 × 1024 | Standard 1024 × 768 | Internet 512 × 384 |
| High (4:1) | 255 seconds | 153 seconds | 38 seconds |
| Standard (8:1) | 126 seconds | 76 seconds | 19 seconds |
| Fast (16:1) | 63 seconds | 38 seconds | 8 seconds |

TABLE 3

Wireless transmission times assuming a 56 Kbps transmission rate

| | Resolution | | |
|---|---|---|---|
| Quality | Photographic 1280 × 1024 | Standard 1024 × 768 | Internet 512 × 384 |
| High (4:1) | 51 seconds | 31 seconds | 8 seconds |
| Standard (8:1) | 23 seconds | 15 seconds | 4 seconds |
| Fast (16:1) | 13 seconds | 8 seconds | 2 seconds |

As an option, an operator can also transmit the PPF photographs to a personal computer via the USB cradle. This process employs the same packet-based communication protocols except that it happens over a wire-line connection and in the foreground. Photographs transmitted to the PhotoServer or to the PhotoDesktop can be synchronized using sections of the PPF file. Synchronization is the act of supplying any supplemental data to images in order to enhance them to the maximum quality PPF record available. For instance, synchronization of a fast quality PPF file and a high quality PPF file of the same image will result in enhancement of the fast quality image to high quality.

The Progressive Photograph Format (PPF) itself comprises a sequence of sequential image sections ordered by decreasing optical significance. The first section is the most significant image data and represents a complete fast quality version of the image. This is followed by sections two and three which contain subsequent detail data to enhance the image to normal quality and high quality respectively. Using the PPF approach, a fast quality image can be transmitted to the PhotoServer, taking maximum advantage of transmission data size and speed. The server image can then be synchronized with the remaining components of the PPF file at a later time to restore the image to its original maximum quality. With this unique approach, the operator does not have to sacrifice image quality in order to maximize wireless throughput.

Now, the remainder of image processing can be performed at the target platform (e.g., server or desktop computer) in a straightforward manner, without the size and portability constraints that are imposed on the digital camera. Moreover, one can apply all of the processor capability of the target platform. Note, however, that the foregoing approach may be modified so that the image is (optionally) color processed at the digital camera (e.g., for viewing as a color JPEG file), yet transmitted as a PPF file, thus preserving the high-compression benefit for wireless transmission.

Figure 4A:
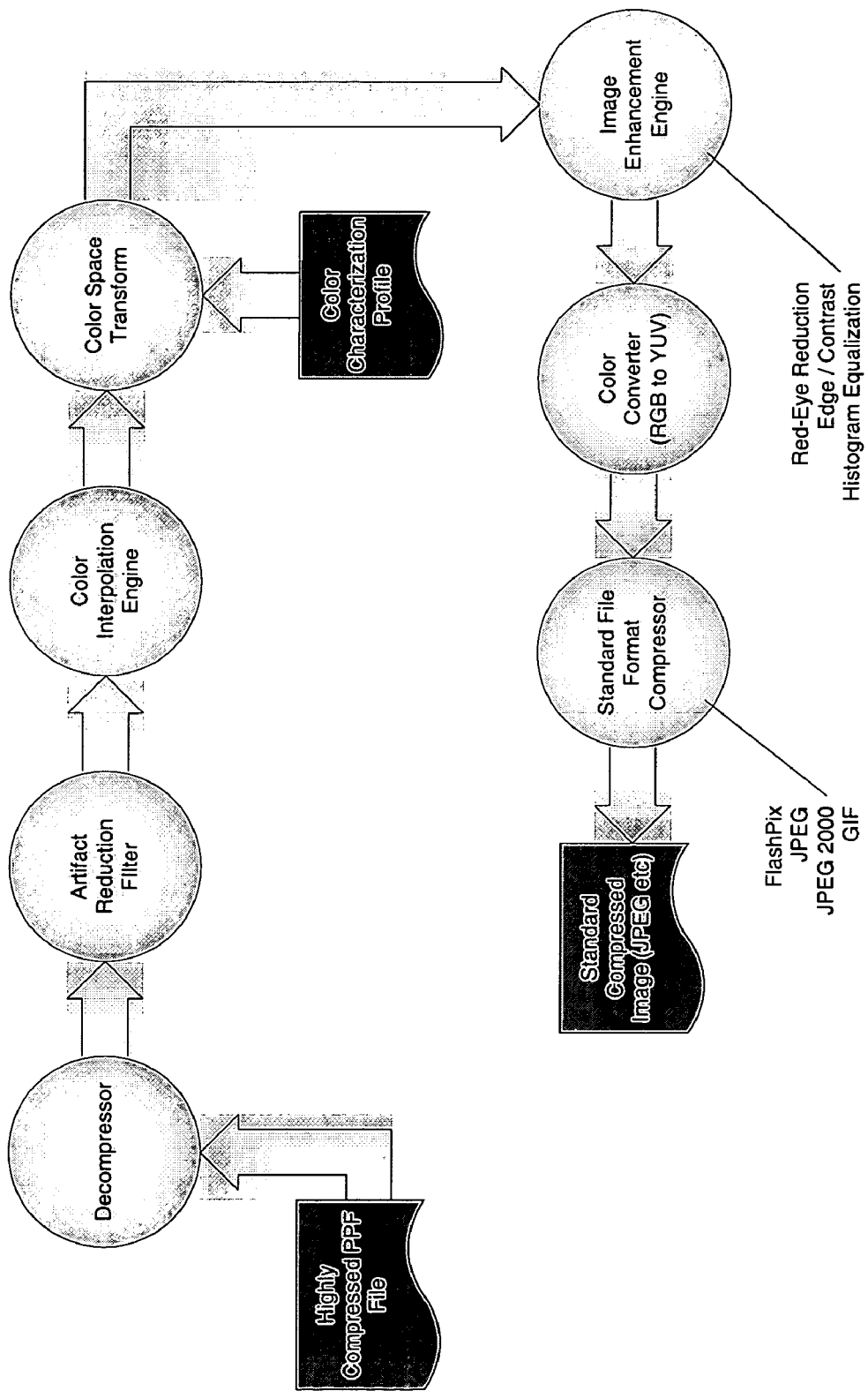
FIG. 4A is a block diagram illustrating overall processing at a target platform (e.g., server or desktop computer).

FIG. 4A provides an overview of the completion of image processing at the target platform. The PhotoServer receives highly compressed PPF files from the digital camera and completes the image processing cycle. In the decompression phase, a decompressed image is reconstructed from the PPF file. The resulting image is then run through an artifact reduction filter which compensates for artifacts introduced by the camera during the compression process. The result is then arranged into the original sensor color mosaic. The image is then processed by the color interpolation engine, which removes the mosaic pattern and produces a high quality color image. The resulting image is in the RGB color space. Next the color characterization profile of the specific camera (recorded at factory assembly time) is used to balance the colors in the image to match human color perception. This stage makes up for the differences in how the camera sensor and the human eye see color. The image enhancement phase is optional. In this phase the balanced color image is processed to reduce red-eye artifacts, to enhance contrast, to harden and smooth edges, or even to interpolate to a higher resolution. Finally, the image is again compressed. The resulting output is an industry standard, high quality color image file such as JPEG, JPEG 2000 or FlashPix.

Figure 4B:
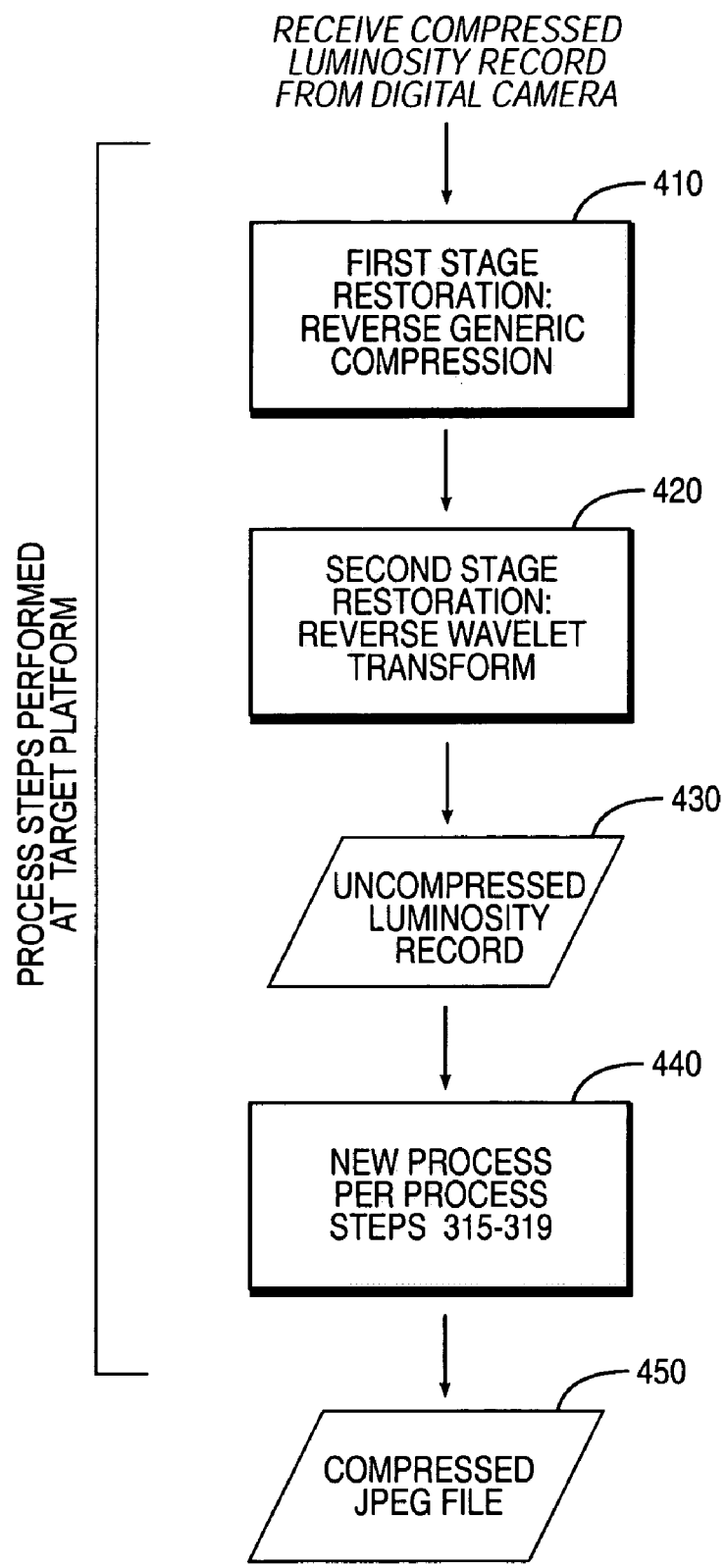
FIG. 4B is a block diagram illustrating method steps of the present invention for completing image processing at a target platform (e.g., server or desktop computer).

FIG. 4B illustrates specific method steps involved at the target platform. First, the decompression process 410 decompresses the compressed luminosity record (e.g., reversing the Huffman coding and RLE compression). Thereafter, the wavelet transform is reversed, for restoring the uncompressed luminosity record. This is illustrated by the inverse wavelet transform process 420. Reversing the wavelet transform process yields an uncompressed luminosity record 430—that is, a record of that which was originally sent from the camera's sensor, in full resolution. As previously noted, some loss of information from the original luminosity record may result, but it is typically at a rate that is imperceptible to the human eye. It is possible to have near lossless compression/decompression but, in the preferred embodiment, some controlled loss is accepted in order to further optimize the process (e.g., avoid adding precision that would not result in better image quality, as perceived by the user). As indicated by process block 440, conventional image processing (e.g., process steps 315-319) can now be applied to the uncompressed luminosity record for generating a color image for storage in a desired (e.g., typically standardized) file format. The end result is that one still ends up with a color digital image stored in one of the standardized formats (e.g., JPEG image 450). After processing the image, the PhotoServer may conveniently be used to further propagate the image, such as making the image available over the Internet to a multitude of other users (e.g., family and friends of the camera user). The image may, of course, also be rendered in hard copy, using a printing device available to the computer.

Note that, in accordance with the teachings of the present invention, the compute-intensive elements of digital image processing have been deferred such that they need not be performed at the digital camera but, instead, are deferred until the image arrives at the target platform (e.g., more-powerful desktop or server computer). In this manner, the amount of processing capability required at the camera is decreased, or for a given level of processing power the images may be processed faster at the digital camera. Additionally, the bandwidth required to transmit images from the digital camera to the target platform is substantially reduced, thereby facilitating wireless transmission of the images. At the same time, the present invention accomplishes this without losing the advantages of high compression, such as decreased storage requirement and decreased transmission time for downloading images.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a digital imaging system, a method for distributed digital image processing, the method comprising:
   recording luminosity information at a first device, for representing an image that has been digitally captured at the first device;
   without performing color interpolation at the first device, generating compressed luminosity information at the first device by applying a wavelet transform compression to individual color planes that comprise the luminosity information, followed by applying quantization and compression to the luminosity information;
   packaging said compressed luminosity information, in a plurality of data packets suitable for progressive transmission of image data corresponding to varying levels of photographic significance, with header information identifying the individual color planes that comprise the luminosity information;
   progressively transmitting a first set of data packets from said plurality of data packets of said compressed luminosity information to a second device, while remaining data packets from said plurality of data packets are maintained at the first device;
   restoring said luminosity information from said first set of data packets of said compressed luminosity information at the second device;
   converting said luminosity information at the second device into a color image, including performing color interpolation at the second device, corresponding to the progressively transmitted data packets received by the second device; and
   in response to receipt of a second set of data packets from the remaining data packets, said second set of data packets corresponding to a higher level of photographic significance, converting a lower-quality representation of the image into a higher-quality representation by synchronizing said lower-quality representation with said higher-quality representation at the second device.

2. The method of claim 1, wherein said luminosity information comprises light-level information for representing an image that has been digitally captured at the first device.

3. The method of claim 1, wherein said generating step includes:
   applying generic binary compression to said compressed luminosity information at the first device.

4. The method of claim 3, wherein said step of applying generic binary compression includes applying run-length encoding.

5. The method of claim 3, wherein said step of applying generic binary compression includes applying Huffman coding.

6. The method of claim 1, wherein said restoring step includes:
   reversing said compression that occurred at the first device.

7. The method of claim 1, wherein said step of converting said luminosity information into a color image includes:
   interpolating color information for the image from said luminosity information.

8. The method of claim 7, wherein said interpolating step includes:
   apply a YUV transformation to said luminosity information at the second device for converting said luminosity information into a color image in YUV color space.

9. The method of claim 7, wherein said step of converting said luminosity information into a color image further includes:
   converting the color image into a standard file format at the second device.

10. The method of claim 9, wherein said standard file format comprises a JPEG file format.

11. The method of claim 9, wherein said step of converting said luminosity information into a color image further includes:
    applying JPEG compression to the color image at the second device.

12. The method of claim 1, wherein said step of transmitting said compressed luminosity information to a second device includes:
    transmitting said compressed luminosity information from a digital camera to a computer using a packet-based communication protocol.

13. The method of claim 12, wherein said step of transmitting said compressed luminosity information from a digital camera to a computer using packet-based communication protocol includes:
    selectively connecting the digital camera to a cellular phone for establishing a wireless communication session with the computer.

14. The method of claim 1, wherein said second device comprises a computer with connectivity to the Internet and wherein said method further includes making the color image available to multiple users.

15. In a digital imaging system, a method for deferring digital image processing, the method comprising:

recording sensor information from an image sensor at a first device, for representing an image that has been recorded at the image sensor of the first device;

compressing said sensor information prior to color processing by applying a transformation compression to individual color planes that comprise the sensor information, for generating compressed sensor information at the first device;

packaging said compressed sensor information, in a plurality of data packets suitable for progressive transmission of image data corresponding to varying levels of photographic significance, with header information identifying the individual color planes that comprise the sensor information;

without having performed color processing at the first device, progressively transmitting a first set of data packets from said plurality of data packets of said compressed sensor information to a second device, while remaining data packets from said plurality of data packets are maintained at the first device;

decompressing said compressed sensor information at the second device, whereupon said sensor information may thereafter be processed into a color image corresponding to the progressively transmitted data packets received by the second device; and in response to receipt of a second set of data packets from the remaining data packets, said second set of data packets corresponding to a higher level of photographic significance, decompressing said second set of data packets to convert a lower-quality representation of the image into a higher-quality representation by synchronizing said lower-quality representation with said higher-quality representation at the second device.

16. The method of claim 15, wherein said sensor information comprises light-level information for representing an image that has been digitally recorded at the first device.

17. The method of claim 15, wherein said compression step includes:

applying a wavelet transform to individual bit planes that comprise the sensor image; and applying compression to the transformed sensor image, to create said compressed sensor information at the first device.

18. The method of claim 17, wherein said step of applying compression to the transformed sensor image includes:

applying compression using run-length encoding.

19. The method of claim 17, wherein said step of applying compression to the transformed sensor image includes:

applying compression using Huffman coding.

20. The method of claim 17, wherein said decompression step includes:

reversing said wavelet transform that occurred at the first device.

21. The method of claim 15, further comprising:

converting said sensor information into a color image by interpolating color information for the image from said sensor information.

22. The method of claim 21, wherein said converting step includes:

apply a YUV transformation to said sensor information at the second device for converting said sensor information into a color image in YUV color space.

23. The method of claim 21, wherein said converting step includes:

converting the color image into a standard file format at the second device.

24. The method of claim 23, wherein said standard file format comprises a JPEG file format.

25. The method of claim 23, wherein said converting step includes:

applying JPEG compression to the color image at the second device.

26. The method of claim 15, wherein said step of transmitting said compressed sensor information to a second device includes:

transmitting said compressed sensor information from a digital camera to a computer in a wireless manner using a communication protocol.

27. The method of claim 26, wherein said step of transmitting said compressed sensor information from a digital camera to a computer includes:

selectively connecting the digital camera to a cellular phone for establishing a wireless communication session with the computer.

28. The method of claim 15, wherein said second device comprises a computer with connectivity to the Internet and wherein said method further includes making the color image available to multiple users.

29. An imaging system providing deferred image processing, the system comprising:

an imager having a sensor for recording luminosity information for a visual image captured by the imager, said luminosity information comprising luminosity values recorded by the sensor;

a compressor module for compressing said luminosity information by applying a transformation compression to each individual color planes that comprise the luminosity information, for generating compressed luminosity information at the imager without having performed color processing, wherein the compressed luminosity information is packaged into a plurality of data packets suitable for progressive transmission of image data, corresponding to varying levels of photographic significance, in a bit stream with header information identifying the individual color planes that comprise the luminosity information;

a wireless communication link for progressively transmitting a first set of data packets from said plurality of data packets of said compressed luminosity information to a target device, while remaining data packets from said plurality of data packets are maintained in a storage coupled with a first device;

a decompression module for decompressing said compressed luminosity information at the target device, whereupon said sensor information may thereafter be processed into a color image corresponding to the progressively transmitted data packets received by the target device; and in response to receipt of a second set of data packets from the remaining data packets, said second set of data packets corresponding to a higher level of photographic significance, the decompression module for decompressing said second set of data packets to convert a lower-quality representation of the image into a higher-quality representation by synchronizing said lower-quality representation with said higher-quality representation at the target device.

30. The system of claim 29, wherein said luminosity information comprises brightness information for representing an image that has been digitally captured at the imager.

31. The system of claim 29, wherein said compression module includes:

a generic binary compression module for compressing said luminosity information at the first device.

32. The system of claim 31, wherein said generic binary compression module applies run-length encoding.

33. The system of claim 31, wherein said generic binary compression module applies Huffman coding.

34. The system of claim 31, further comprising a generic binary decompression module for reversing generic binary compression that has been applied at the imager.

35. The system of claim 29, wherein said target device includes:
an interpolation module for interpolating color information for the image from said luminosity information.

36. The system of claim 35, wherein said interpolation module applies a YUV transformation to said luminosity information at the target device for converting said luminosity information into a color image in YUV color space.

37. The system of claim 29, wherein said target device further includes: a compression module for converting the color image into a standard compressed file format at the target device.

38. The system of claim 37, wherein said standard compressed file format comprises a JPEG file format.

39. The system of claim 37, wherein said compression module of said target device includes a JPEG module for applying JPEG compression to the color image at the target device.

40. The system of claim 29, wherein said imager comprises a digital camera, wherein said target device comprises a computer, and wherein said communication link is coupled to a cellular phone device for transmitting said compressed luminosity information from said digital camera to said computer in a wireless manner using a communication protocol.

41. The system of claim 40, wherein said communication link is selectively coupled to the cellular phone for establishing a wireless communication session between the digital camera and the computer.

42. The system of claim 29, wherein said target device comprises a computer with connectivity to the Internet, which provides access to the color image to multiple users.

43. The system of claim 29, wherein said imager comprises a selected one of a digital camera, a digital camcorder, and a closed circuit surveillance camera.

44. The system of claim 29, wherein said target device comprises a desktop computer.

45. The system of claim 29, wherein said target device comprises a server computer.

46. The system of claim 29, wherein said sensor comprises a complementary metal-oxide semiconductor (CMOS) image sensor.

47. The system of claim 29, wherein said sensor comprises a charge-coupled device (CCD) image sensor.

48. The system of claim 29, wherein said luminosity information comprises gray-scale luminosity information, prior to being processed into a color image.

49. The system of claim 29, wherein said compressed luminosity information comprises a wavelet transformed and compressed luminosity record of the image recorded at the sensor.

50. In a digital imaging system, a method for distributed digital image processing, the method comprising:
recording luminosity information at a first device, for representing an image that has been digitally captured at the first device;
while deferring color interpolation to a second device, generating compressed luminosity information at the first device by applying a wavelet transform compression to individual color planes that comprise the luminosity information, followed by applying quantization and compression to the luminosity information;
packaging said compressed luminosity information, in a plurality of data packets suitable for progressive transmission of image data corresponding to varying levels of photographic significance, with header information identifying the individual color planes;
progressively transmitting a first set of data packets from said plurality of data packets of said compressed luminosity information to the second device, while remaining data packets from said plurality of data packets are maintained at the first device;
restoring said luminosity information from said first set of data packets of said compressed luminosity information at the second device;
converting said luminosity information at the second device into a color image, including performing color interpolation at the second device, corresponding to the progressively transmitted data packets received by the second device; and
in response to receipt of a second set of data packets from the remaining data packets, said second set of data packets corresponding to a higher level of photographic significance, converting a lower-quality representation of the image into a higher-quality representation by synchronizing said lower-quality representation with said higher-quality representation at the second device.

* * * * *